US010424083B2

(12) United States Patent
Sinharoy et al.

(10) Patent No.: US 10,424,083 B2
(45) Date of Patent: Sep. 24, 2019

(54) POINT CLOUD COMPRESSION USING HYBRID TRANSFORMS

(71) Applicant: Samsung Electronics Co., Ltd, Suwon-si (KR)

(72) Inventors: Indranil Sinharoy, Richardson, TX (US); Madhukar Budagavi, Plano, TX (US); Youngkwon Lim, Allen, TX (US); Hossein Najaf-Zadeh, Allen, TX (US); Sungryeul Rhyu, Yongin (KR); Esmaeil Faramarzi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/165,817

(22) Filed: Oct. 19, 2018

(65) Prior Publication Data

US 2019/0122393 A1 Apr. 25, 2019

Related U.S. Application Data

(60) Provisional application No. 62/617,869, filed on Jan. 16, 2018, provisional application No. 62/683,429, (Continued)

(51) Int. Cl.
*G06T 9/00* (2006.01)
*G06T 15/04* (2011.01)
*G06T 7/73* (2017.01)
*G06T 5/00* (2006.01)
*G06K 9/62* (2006.01)
(Continued)

(52) U.S. Cl.
CPC ............ *G06T 9/001* (2013.01); *G06K 9/6202* (2013.01); *G06T 5/005* (2013.01); *G06T 7/73* (2017.01);
(Continued)

(58) Field of Classification Search
None
See application file for complete search history.

(56) References Cited

U.S. PATENT DOCUMENTS 6,438,266 B1   8/2002   Bajaj et al.
6,525,722 B1   2/2003   Deering
(Continued)

OTHER PUBLICATIONS

Houshiar et al., "3D Point Cloud Compression using Conventional Image Compression for Efficient Data Transmission", 2015 XXV International Conference on Information, Communication and Automation Technologies (ICAT), Dec. 3, 2015, 8 pages.
(Continued)

*Primary Examiner* — Frank S Chen

(57) ABSTRACT

A decoding device, an encoding device and a method for point cloud decoding is disclosed. The method includes decoding the compressed bitstream into a first set and second set of 2-D frames. The first set of 2-D frames include first set of regular patches representing geometry of a 3-D point cloud and the second set of 2-D frames include first set of regular patches representing texture of the 3-D point cloud. The method includes identifying in the first set of 2-D frames, a missed points patch representing geometry of points of the 3-D point cloud not included in the regular patches, and in the second set of 2-D frames a missed points patch that represents texture of the points of the 3-D point cloud not included in the regular patches. The method also includes generating, using the set of 2-D frames, the 3-D point cloud using the missed points patches.

20 Claims, 16 Drawing Sheets

Related U.S. Application Data filed on Jun. 11, 2018, provisional application No. 62/644,025, filed on Mar. 16, 2018, provisional application No. 62/681,728, filed on Jun. 7, 2018, provisional application No. 62/648,069, filed on Mar. 26, 2018, provisional application No. 62/653,793, filed on Apr. 6, 2018, provisional application No. 62/575,412, filed on Oct. 21, 2017, provisional application No. 62/575,842, filed on Oct. 23, 2017, provisional application No. 62/590,159, filed on Nov. 22, 2017, provisional application No. 62/654,125, filed on Apr. 6, 2018.

(51) Int. Cl.
   *G06T 17/20* (2006.01)
   *G06T 5/50* (2006.01)

(52) U.S. Cl.
   CPC .............. *G06T 15/04* (2013.01); *G06T 5/50* (2013.01); *G06T 17/20* (2013.01); *G06T 2207/10028* (2013.01)

(56) References Cited

U.S. PATENT DOCUMENTS

| | | |
|---|---|---|
| 9,787,321 B1 | 10/2017 | Hemmer et al. |
| 2016/0086353 A1 | 3/2016 | Lukac et al. |
| 2019/0018680 A1* | 1/2019 | Charamisinau ..... G06F 16/2246 |
| 2019/0087979 A1* | 3/2019 | Mammou ............... G06T 9/001 |
| 2019/0114504 A1* | 4/2019 | Vosoughi ............... G06K 9/622 |

OTHER PUBLICATIONS

Huang et al., "A Generic Scheme for Progressive Point Cloud Coding", IEEE Transactions on Visualization and Computer Graphics, vol. 14, No. 2, Mar.-Apr. 2008, 14 pages.

Mekuria et al., "MP3DG-PCC, Open Source Software Framework for Implementation and Evaluation of Point Cloud Compression", Amsterdam, The Netherlands—Oct. 15-19, 2016, 4 pages., www.researchgate.net/profile/Rufael_Mekuria/publication/308842012_MP3DG.

Subramanyam et al., "Inter Frame Compression for 3D Dynamic Point Clouds" Subramanyam, S. (Jan. 2017). Inter Frame Compression for 3D Dynamic Point Clouds., Oct. 27, 2017, 80 pages. https://repository.tudelft.nl/islandora/object/uuid:32148d56-ebf3-4766-be63-85a7d236fd48?collection=education.

ISA/KR, "International Search Report and Written Opinion of the International Searching Authority," Application No. PCT/KR2018/012483, dated Jan. 30, 2019, 10 pages.

International Organization for Standardization, "Coding of Moving Pictures and Audio," ISO/IEC JTC1/SC29/WG11 MPEG2014/N16538, Chengdu, CN, Oct. 2016, 12 pages.

* cited by examiner

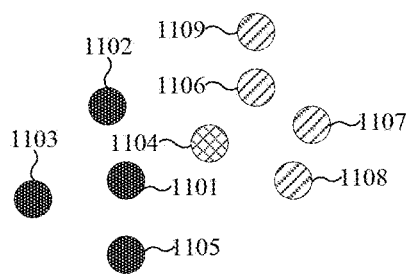
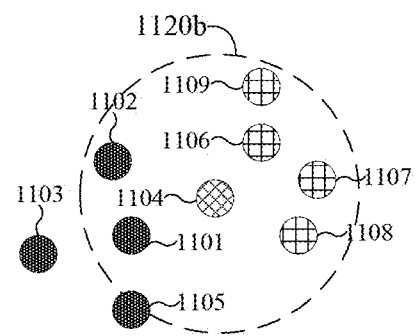
FIGURE 11D                    FIGURE 11E

POINT CLOUD COMPRESSION USING HYBRID TRANSFORMS

CROSS-REFERENCE TO RELATED APPLICATION AND CLAIM OF PRIORITY

This application claims priority under 35 U.S.C. § 119(e) to (i) U.S. Provisional Patent Application No. 62/575,412 filed on Oct. 21, 2017, (ii) U.S. Provisional Patent Application No. 62/575,842 filed on Oct. 23, 2017, (iii) U.S. Provisional Patent Application No. 62/590,159 filed on Nov. 22, 2017, (iv) U.S. Provisional Patent Application No. 62/617,869 filed on Jan. 16, 2018, (v) U.S. Provisional Patent Application No. 62/648,069 filed on Mar. 26, 2018, (vi) U.S. Provisional Patent Application No. 62/644,025 filed on Mar. 16, 2018, (vii) U.S. Provisional Patent Application No. 62/654,125 filed on Apr. 6, 2018, (viii) U.S. Provisional Patent Application No. 62/653,793 filed on Apr. 6, 2018, (ix) U.S. Provisional Patent Application No. 62/681,728 filed on Jun. 7, 2018, and (x) U.S. Provisional Patent Application No. 62/683,429 filed on Jun. 11, 2018. The above-identified provisional patent application is hereby incorporated by reference in its entirety.

TECHNICAL FIELD

This disclosure relates generally to compression and coding of multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. Six Degrees of Freedom (6DoF) is the next level of immersive experience where in the user can turn his head as well as move around in a virtual/augmented environment. Multimedia data that is three-dimensional (3-D) in nature, such as point clouds, is needed to provide 6DoF experience.

Point clouds and meshes are a set of 3-D points that represent a model of a surface of an object or a scene. Point clouds are common in a variety of applications such as gaming, 3-D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. Compression hardware and processes of point clouds are different than traditional compression hardware and processes for traditional two-dimensional (2-D) multimedia.

SUMMARY

This disclosure provides point cloud compression using hybrid transforms.

In a first embodiment, a decoding device for point cloud decoding is provided. The decoding device includes a communication interface and a processor that is operably coupled to the communication interface. The communication interface is configured to receive a compressed bitstream. The processor is configured to decode the compressed bitstream into a first set of two-dimensional (2-D) frames and a second set of 2-D frames. The first set of 2-D frames include a first set regular patches that represent geometry of a three-dimensional (3-D) point cloud. The second set of 2-D frames include a second set of regular patches representing texture of the 3-D point cloud. Patches of the first and second set of regular patches represent respective clusters of 3-D points in the 3-D point cloud. The processor is also configured to identify in the first set of 2-D frames, a missed points patch that represents geometry of points of the 3-D point cloud not included in the first set of regular patches and in the second set of 2-D frames the missed points patch that represents texture of points of the 3-D point cloud not included in the second set of regular patches. The processor is further configured to generate using the sets of 2-D frames the 3-D point cloud using the first and second sets of regular patches and missed points patches.

In another embodiment an encoding device for point cloud encoding is provided. The encoding device includes a processor and a communication interface operably coupled to the processor. The processor is configured to generate, for a three-dimensional (3-D) point cloud, a first set of two-dimensional (2-D) frames that include a first set of regular patches that represent the geometry of the 3-D point cloud and a second set of 2-D frames that include the a second set of regular patches representing the texture of the 3-D point cloud. Patches of the first and second sets of regular patches represent respective clusters of 3-D points in the 3-D point cloud. The processor is also configured to detect points in the 3-D point cloud that are not represented in any of the sets of regular patches. The processor is further configured to generate a missed points patch that represents geometry of the detected points, and a missed points patch that represents texture of the detected points. The processor is additionally configured to include, in the set of first 2-D frames, the missed points patch that represents the geometry of points not included in the first set of regular patches and, in the second set of 2-D frames, the missed points patch that represents the texture of points not included in the second set of regular patches. The processor is also configured to encode the 2-D frames that include the missed points patches to generate a compressed bitstream. The communication interface is configured to transmit the compressed bitstream.

In yet another embodiment a method for decoding is provided. The method includes receiving a compressed bitstream. The method also includes decoding the compressed bitstream into a first set of two-dimensional (2-D) frames and a second set of -D frames, wherein the first set of 2-D frames include first set of regular patches that represent geometry of a three-dimensional (3-D) point cloud and the second set of 2-D frames include the second set of regular patches representing texture of the 3-D point cloud. Patches of the first and second sets of regular patches represent respective clusters of 3-D points in the 3-D point cloud. The method further includes identifying in the first set of 2-D frames, a missed points patch that represents geometry of points of the 3-D point cloud not included in the first set of regular patches, and in the second set of 2-D frames a missed points patch that represents texture of the points of the 3-D point cloud not included in the second set of regular patches. The method also includes generating, using the set of 2-D frames, the 3-D point cloud using the first and second sets of regular patches and the missed points patches.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A, 11B, 11C, 11D, and 11E illustrate an example sorting method for non-structural projections in accordance with an embodiment of this disclosure;

DETAILED DESCRIPTION

Figure 1:
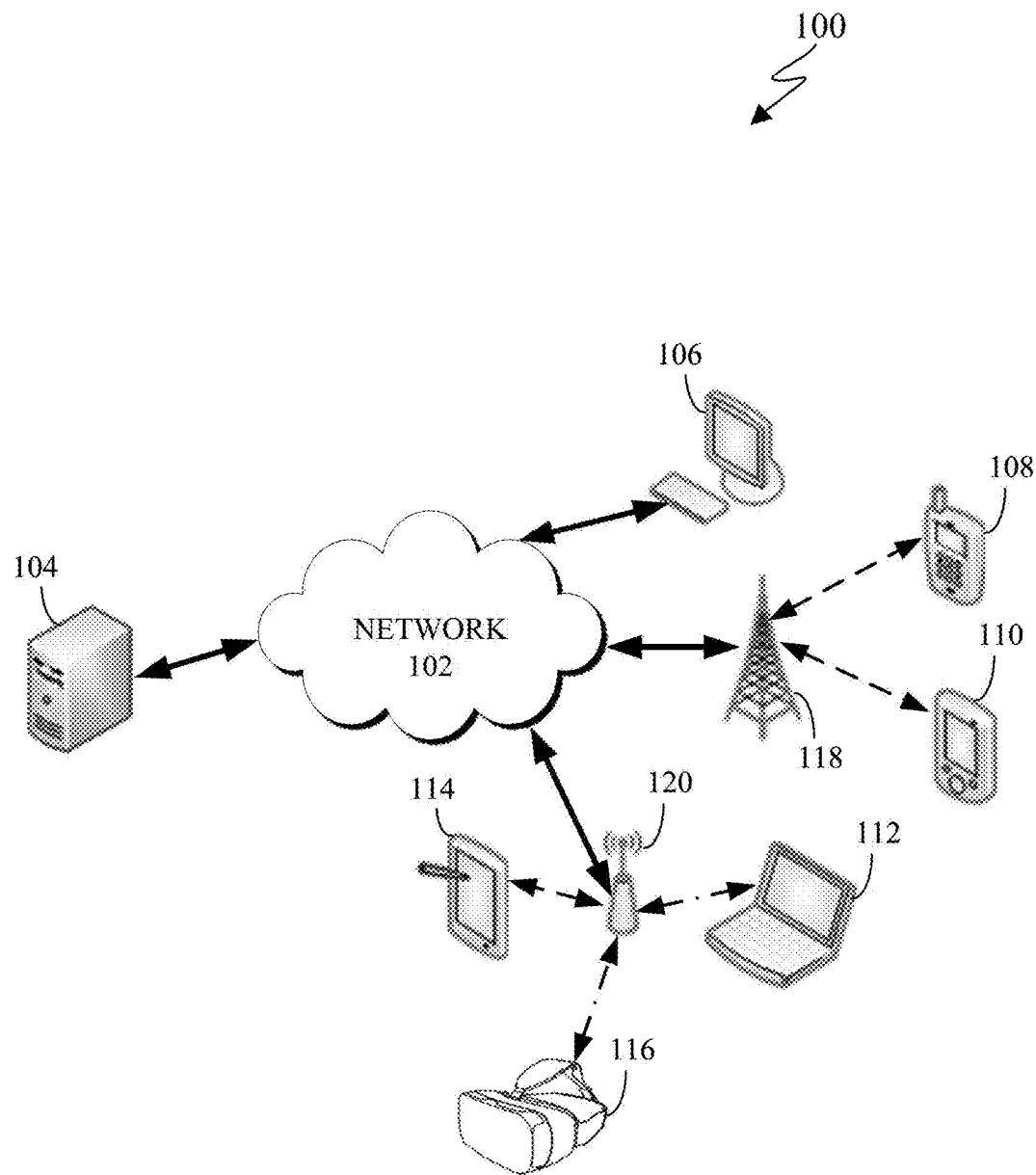
FIG. 1 illustrates an example communication system in accordance with embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual scene. In certain embodiments, VR is a rendered version of both a visual and an audio scene. The rendering is designed to mimic the visual stimuli, and if available audio sensory stimuli, of the real world as naturally as possible to an observer or user as the individual moves within the limits defined by the application or the VR scene. For example, VR places a user into immersive worlds that interact with their head movements. At the video level, VR is achieved by providing a video experience that covers as much of the field of view (FOV) as possible together with the synchronization of the viewing angle of the rendered video with the head movements. Although many different types of devices are able to provide such an experience, head-mounted displays (HMD) are popular devices that enable a user to view the VR scene and adjust the displayed content based on movements of the head of the user. Typically, HMDs rely either on dedicated screens integrated into the device and running with external computers (tethered) or on a device, such as a smartphone, that is inserted into the HMD (untethered). The first approach utilizes lightweight screens and benefiting from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a 3-D representation of an object that is similar to an object in a VR environment. Similarly, a point mesh is a 3-D representation of an object that is similar to an object in a VR environment. Generally, a point cloud is a collection of data points defined by a coordinate system. For example, in a 3-D Cartesian Coordinate System, each point of a point cloud is identified by three coordinates, that of X, Y, and Z. When each point is identified by the three coordinates, a precise location in 3-D environment or space is identified, relative to an origin point. The origin point is a location where the X, Y, and Z axes intersect. The points of a point cloud often represent the external surface of the object. Each point of a point cloud is defined by attributes such as a geometric position of each point within the three coordinates and a texture such as color, intensity, normal, reflectance, and the like.

Similarly, a 3-D mesh is a 3-D representation of an object that is similar to a point cloud. A 3-D mesh illustrates the external structure of an object that is built out of polygons. For example, a 3-D mesh is a collection of vertices, edges, and faces that define the shape of an object. For another example, a mesh (or a point cloud) can be rendered on spherical coordinate system. In certain embodiments, each point can be located in the X, Y, Z coordinates that are within a sphere. Similarly, texture coordinates U and V indicate a location of texture of the image. When the object is rendered, the vertices of the mesh, the corresponding texture coordinate, and the texture image are inputted into a graphical processing unit which maps the mesh onto the 3-D geometry. The user can have a FOV that is positioned at the center of the virtual sphere and sees a portion of the 360° scene corresponding to the viewport. In certain embodiments, alternative shapes can be used instead of a sphere such as a cube, an icosahedron, an octahedron, and the like. Point clouds and meshes are illustrated and discussed in greater detail below with reference to FIG. 4.

Point clouds and meshes are commonly used in a variety of applications, including gaming, 3-D mapping, visualization, medicine, augmented reality, VR, autonomous driving, multi-view replay, 6 degrees of freedom immersive media, to name a few. As used hereinafter, the term 'point cloud' also refers to a '3-D point cloud,' and a '3-D mesh'.

Transmitting a point cloud, from one electronic device to another, often requires significant bandwidth due to the size and complexity of the data associated with a single point cloud. The transmission of a point cloud often requires specific compression techniques to reduce the size of the data prior to transmission. For example, compressing a point cloud can require dedicated hardware or specific compression algorithms or a combination thereof. Generally, compression algorithms for a point cloud are different from compression algorithms of other multimedia forms, such as images and video, VR, and the like.

Embodiments of the present disclosure take into consideration that due to the size constraints of bandwidth, compressing point clouds is necessary to expedite and improve transmission of a point cloud from a source device to another device (such as a user equipment). That is, an uncompressed point cloud uses significant bandwidth for transmission and causes the rendering of the point cloud to be delayed. Certain dedicated hardware components can be used to meet the real-time demands or reduce delays or lags in the rendering of the point cloud. Such hardware components are often expensive. According to embodiments of the present disclosure, compressing the point cloud using a codec decreases the bandwidth for transmission as well as certain types of hardware. For example, a video or image codec such as HEVC, AVC, VP9, VP8, JVNET, and the like can be used to compress a point cloud, when the point cloud is manipulated to fit a 2-D frame. For example the point cloud is manipulated from its original 3-D shape to multiple patches that represent the point cloud in 2-D.

Therefore, embodiments of the present disclosure provide systems and methods for manipulating a 3-D object such as a point cloud. Manipulating the 3-D object includes projecting the 3-D object onto a 2-D frame, such that the frame can be compressed, transmitted to a display device, and the content within the 2-D frame can be reconstructed into the 3-D object and finally rendered such that the 3-D object can be viewed by a user. Various 2-D compression hardware and software components can compress the 3-D point cloud after the point cloud is projected onto multiple 2-D video frames. When the point cloud is deconstructed to fit on multiple 2-D frames, the frames can be transmitted using less bandwidth than transmitting the original point cloud.

A 3-D object can be manipulated by an encoder, transmitted to a decoder, which reconstructs the 3-D object to be viewed by a user. The encoder projects the 3-D object onto one or more 2-D frames, compresses the frames, and generates and transmits a compressed bitstream including the compressed frames. The decoder, receives the bitstream, decompresses the frames, reconstructs, and renders the 3-D object so a user can view the displayed object.

According to embodiments of the present disclosure, architecture for carrying out a point cloud compression using a video codec is provided. Embodiments of the present disclosure provide architecture for point cloud compression using an image codec. A point cloud can be deconstructed, and multiple 2-D frames are generated that include regular patches of the geometry of each point of the point cloud, as well as various attributes or textures of the point cloud. For example, the point cloud can be deconstructed and mapped onto a 2-D frame. The 2-D frame can be compressed using various video or image or both compression.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-116. The client devices 106-116 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 can transmit a point cloud to one or more display devices, such as a client device 106-116. In certain embodiments, each server 104 can include an encoder.

Each client device 106-116 represents any suitable computing or processing device that interacts with at least one server or other computing device(s) over the network 102. In this example, the client devices 106-116 include a desktop computer 106, a mobile telephone or mobile device 108 (such as a smartphone), a personal digital assistant (PDA) 110, a laptop computer 112, a tablet computer 114, and a HMD 116. However, any other or additional client devices could be used in the system 100. In certain embodiments, each client device 106-116 can include a decoder.

In this example, some client devices 108-116 communicate indirectly with the network 102. For example, the client devices 108 and 110 (mobile devices 108 and PDA 110, respectively) communicate via one or more base stations 118, such as cellular base stations or eNodeBs (eNBs). Mobile device 108 includes smartphones. Also, the client devices 112, 114, and 116 (laptop computer, tablet computer, and HMD, respectively) communicate via one or more wireless access points 120, such as IEEE 802.11 wireless access points. As described in more detail below the HMD 116 can display 360° scenes including one or more point clouds. Note that these are for illustration only and that each client device 106-116 could communicate directly with the network 102 or indirectly with the network 102 via any suitable intermediate device(s) or network(s). In certain embodiments, server 104 or any client device 106-114 can be used to compress a point cloud and transmit the data to another client device such as any client device 106-116.

In certain embodiments, the mobile device 108 (or any other client device 106 116) can transmit information securely and efficiently to another device, such as, for example, the server 104. The mobile device 108 (or any other client device 106-116) can function as a VR display when attached to a headset via brackets, and function similar to HMD 116. The mobile device 108 (or any other client device 106-116) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device 106-116 or the server 104 to compress, transmit, receive, render a point cloud, or a combination thereof. For example, the server 104 can then compress and transmit the point cloud data to client devices 106-116. For another example, any client device 106-116 can compress and transmit point cloud data to any client devices 106-116 or to the server 104.

Figure 2:
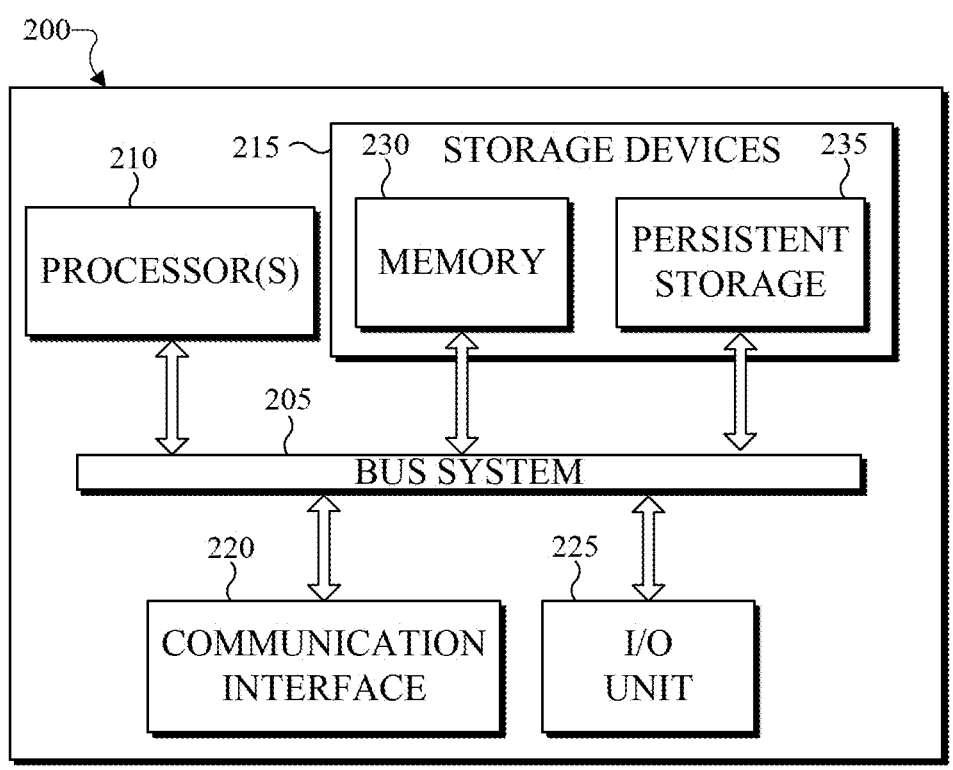
FIG. 2 illustrates an example electronic device in accordance with an embodiment of this disclosure.
Figure 3:
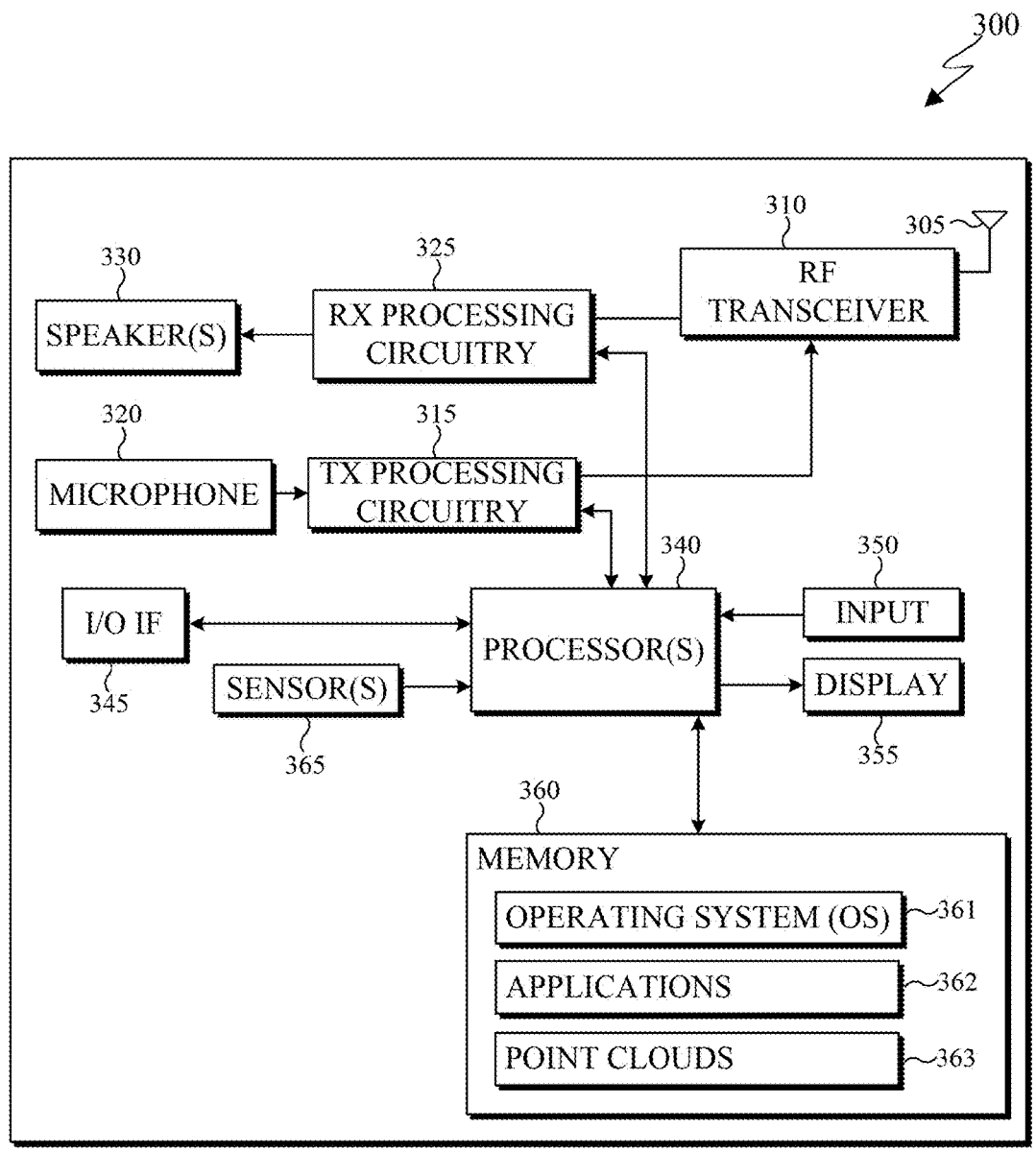
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-116 of FIG. 1.

Server 200 can represent one or more local servers, one or more compression servers, or one or more encoding servers. As shown in FIG. 2, the server 200 includes a bus system 205 that supports communication between at least one processor(s) 210, at least one storage device(s) 215, at least one communications interface 220, and at least one input/output (I/O) unit 225. In certain embodiments, the server 200 is an encoder.

The processor 210 executes instructions that can be stored in a memory 230. The instructions stored in memory 230 can include instructions for decomposing a point cloud, compressing a point cloud. The instructions stored in memory 230 can also include instructions for encoding a point cloud in order to generate a bitstream. The instructions stored in memory 230 can also include instructions for rendering the point cloud on an omnidirectional 360° scene, as viewed through a VR headset, such as HMD 116 of FIG. 1. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready-only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or any other suitable input device. The I/O unit 225 can also send output to a display, printer, or any other suitable output device.

In certain embodiments, server 200 implements the compression of a point cloud, as will be discussed in greater detail below. In certain embodiments, server 200 generates multiple 2-D frames that correspond to the three dimensions of the point cloud. In certain embodiments, server 200 maps the three dimensions of a point cloud into 2-D. In certain embodiments, server 200 generates a compressed bitstream by encoding the compressed two-dimensional frames that represent the point cloud.

Note that while FIG. 2 is described as representing the server 104 of FIG. 1, the same or similar structure could be used in one or more of the various client devices 106-116.

For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only, and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the client devices 106-116 of FIG. 1 can include the same or similar configuration as electronic device 300. In certain embodiments, electronic device 300 is an encoder, a decoder, or both.

In certain embodiments, electronic device 300 is usable with data transfer, image or video compression, image or video decompression, encoding, decoding, and media rendering applications. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a head-mounted display (similar to HMD 116 of FIG. 1), and the like.

As shown in FIG. 3, the electronic device 300 includes an antenna 305, a radio-frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes an operating system (OS) 361, one or more applications 362, and point clouds 363.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, WI-FI router, BLUETOOTH device) of the network 102 (such as a WI-FI, BLUETOOTH, cellular, 5G, LTE, LTE-A, WiMAX, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as decompressing and generating a received point cloud.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute the plurality of applications 362 based on the OS 361 or in response to signals received from eNBs (similar to the base stations 118 of FIG. 1) or an operator. The processor 340 is also coupled to the I/O IF 345 that provides the electronic device 300 with the ability to connect to other devices, such as client devices 106-116. The I/O IF 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track-ball, voice input, or any other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. As discussed in greater detail below, sensor 365 includes inertial sensors (such as accelerometers, gyroscope, and magnetometer), optical sensors, motion sensors, cameras, pressure sensors, heart rate sensors, altimeter, and the like. For example, input 350 can utilize motion as detected by a motion sensor, associated with sensor 365, as an input.

The processor 340 is also coupled to the display 355. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. Display 355 can be sized to fit within a HMD. Display 355 can be a singular display screen or multiple display screens capable of creating a stereoscopic display. In certain embodiments, display 355 is a heads-up display (HUD).

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The point clouds 363 can include various 3-D point clouds, 3-D meshes, 3-D objects, and the like. In certain embodiments, the point clouds 363 can include projections of patches of a 3-D object on one or more 2-D frames. The point clouds 363 can also include one or more 3-D point clouds that are able to be rendered on the display 355.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing the direction of the user for three-dimensional content display identification, etc. Any of these sensor(s) 365 may be located within the electronic device 300, within a secondary device operably connected to the electronic device 300, within a headset configured to hold the electronic device 300, or in a singular device where the electronic device 300 includes a headset.

As will be discussed in greater detail below, in this illustrative embodiment, the electronic device 300 receives an encoded and compressed bitstream. The electronic device 300 decodes the received bitstream into multiple 2-D frames. In certain embodiments, the decoded bitstream also includes an occupancy map. The electronic device 300 decompresses the multiple 2-D frames. The multiple 2-D frames can include a set of frames that indicates coordinates, such as a geographic location of each point of a point cloud. For example, the frames can include a pictorial depiction, such as one or more patches of each geometric point of the point cloud as represented in 2-D. Another set of frames can include texture that is associated with each point, such as the color of each point. The electronic device 300 can then reconstruct and render the point cloud in three dimensions.

As will be discussed in greater detail below, in this illustrative embodiment, electronic device 300 can be similar to server 200 and encode a point cloud. The electronic device 300 can generate multiple 2-D frames that represent the geometry and texture of the point cloud. The point cloud can be mapped to the one or more 2-D frames. For example, one set of frames can include the geometric points as depicted in patches. In another example, another set of frames can include the texture or color or both of the point cloud. In certain embodiments the data representing the point cloud on the 2-D frames can be structured, semi-structured, or non-structured.

The electronic device 300 can identify points that are missed from the original point cloud to the projected patches on the 2-D frame. If missed points are identified, the electronic device 300 can generate another patch that includes the missed points and place the missed points patch into the 2-D geometry and texture frames. For example, the missed points patch that includes the geometry is included in the 2-D frame that includes the geometry patches. Similarly, the missed points patch that includes a texture attribute is included in the 2-D frame that includes the texture attribute patches. The missed points patch can be ordered in a structured, semi-structured, or non-structured manner. The electronic device 300 can compress the 2-D frames. The electronic device 300 can generate an occupancy map to indicate the location of valid pixels within each frame. The electronic device 300 can encode the frames to generate a compressed bitstream.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
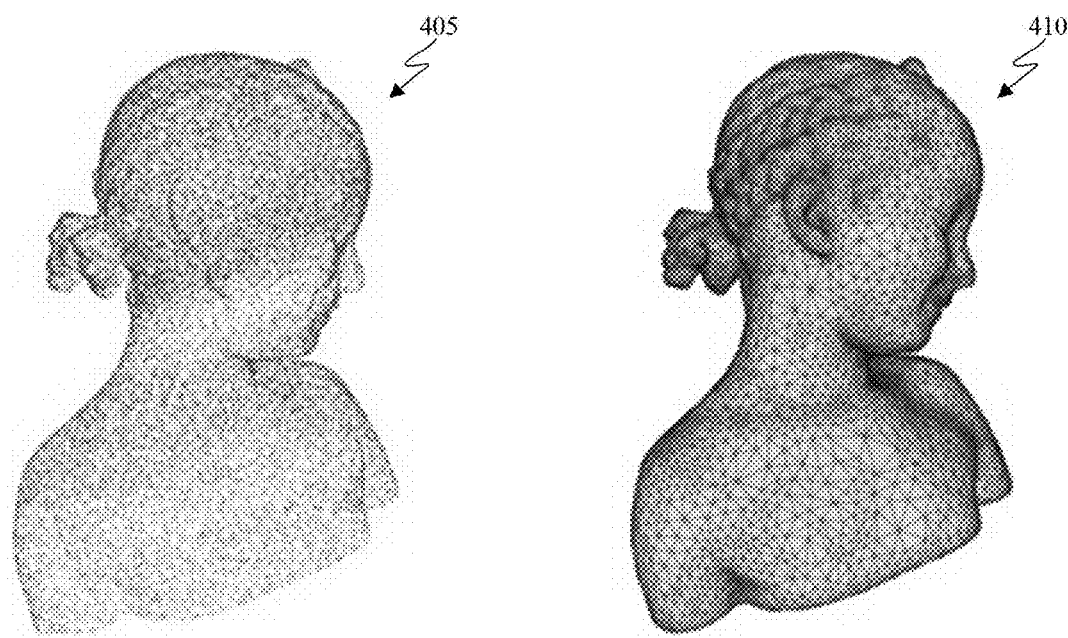
FIG. 4 illustrates a point cloud and an mesh in accordance with an embodiment of this disclosure.

FIG. 4 illustrates a point cloud 405 and an example mesh 410 in accordance with an embodiment of this disclosure. The point cloud 405 depicts an illustration of a point cloud. A point cloud is digitized data that visually defines an object in 3-D space. As depicted, the point cloud 405 includes a number of points, with each point representing an external coordinate of the object, similar to a topographical map. For example, each point can include one or more attributes. The attributes can include a geometry, such as a geographical location. The attributes of each point can also include color, intensity, texture, motion, material properties, and the like. Attributes other than geometry can be referred to as a texture such that texture represents various aspects and properties that are associated with each point of the point cloud.

Similarly, mesh 410 depicts an illustration of a 3-D mesh. The mesh 410 is a digitized data that visually defines an object in 3-D space. The pictorial depiction of the mesh 410 is defined by many polygonal or triangular interconnectivity of information between the various points. Each polygon can include various information, such as an attribute. The attribute can include geometry and texture. Texture includes color reflectiveness, motion, and the like. For example, topological data provide connectivity information among vertices such as adjacency of vertices, edges, and faces. Geometrical information provides the geometric location of each vertex in 3-D space. Attribute information provides the normal, color, and application dependent information for each individual vertex. The vertices of each polygon are similar to the points in the point cloud 405. Each polygon of the mesh 410 represents the external surface of the object.

Point clouds (such as the point cloud 405) and meshes (such as the mesh 410), utilize substantial bandwidth to transmit from one computing device to another. Compression is necessary to reduce storage and bandwidth requirements. For example, lossy compression can compress a point cloud and mesh while maintaining the distortion within a tolerable level while reducing the size of the data.

Figure 5:
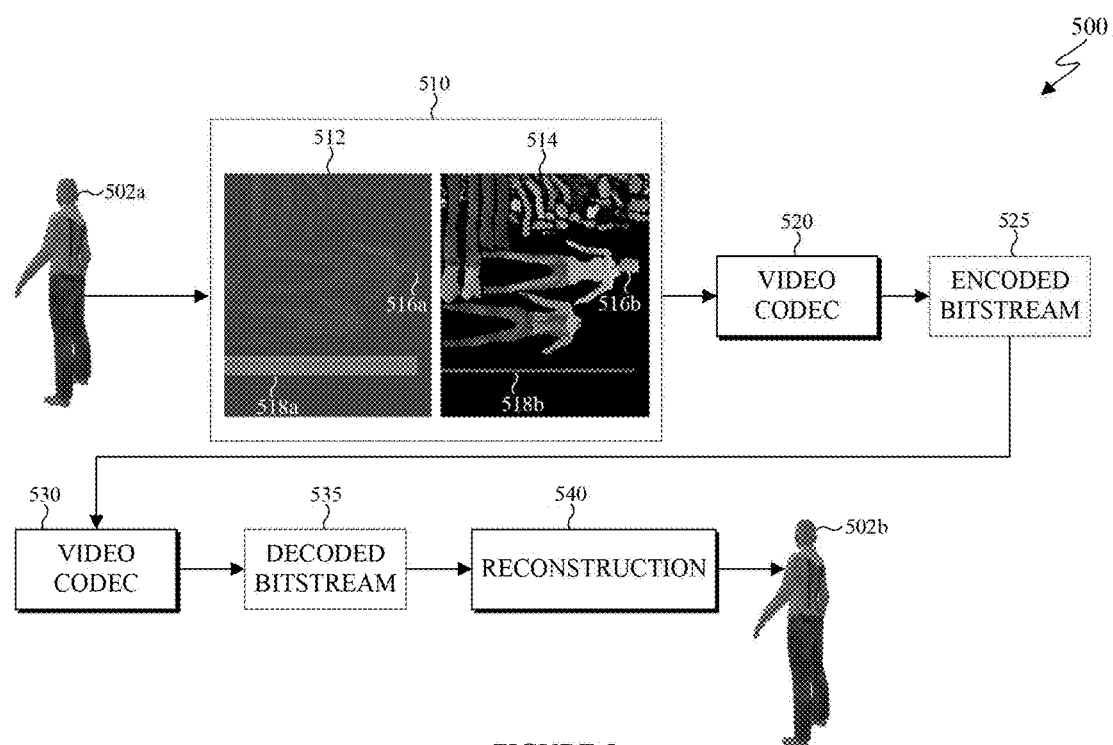
FIG. 5 illustrates a process of deconstructing, transmitting and reconstructing a point cloud accordance with an embodiment of this disclosure.

FIG. 5 illustrates a process 500 of deconstructing, transmitting, and reconstructing a point cloud in accordance with an embodiment of this disclosure. The process 500 is a high level overview of embodiments of the present disclosure. In certain embodiments, the process 500 can be performed in part by the server 104 of FIG. 1 or any of the client devices 106-116 of FIG. 1 both of which can include internal components similar to the server 200 of FIG. 2 or the electronic device 300 of FIG. 3. The embodiment of the process 500 is for illustration only. Other embodiments can be used without departing from the scope of the present disclosure.

An encoder, similar to the encoder 600 of FIG. 6A, discussed in greater detail below, receives point cloud 502a. The point cloud 502a can be similar to the point cloud 405 of FIG. 4. The point cloud 502a can be generated, created, received, by the encoder or another device, such as an electronic device. An electronic device, according to embodiments of the present disclosure, can include personal computers (such as a laptop, a desktop), a workstation, a server, a television, an appliance, and the like. An electronic device can also include one or more cameras that are configured to capture an object to create a point cloud. Additionally, the electronic device can be at least one of a part of a piece of furniture or building/structure, an electronic board, an electronic signature receiving device, a projector, or a measurement device. In certain embodiments, the electronic device can be a portable electronic device such as a portable communication device (such as a smartphone or mobile phone), a laptop, a tablet, an electronic book reader (such as an e-reader), a personal digital assistants (PDAs), a portable multimedia player (PMPs), a MP3 player, a mobile medical device, a virtual reality headset, a portable game console, a camera, and a wearable device, among others. The electronic device is one or a combination of the above-listed devices. Additionally, the electronic device as disclosed herein is not limited to the above-listed devices, and can include new electronic devices depending on the development of technology.

The point cloud 502a can include any number of individual points to create a smooth virtual 3-D object. Each point of the point cloud 502a includes a geographic coordinate that is based on an X, Y, and Z position in 3-D space. The geographic coordinates can be obtained by a depth sensor, such as a Light Detection and Ranging (LiDAR) device, an RGBD sensor such as a Kinect, a multi-view camera-projector rig, or computer generated. Additionally, each point of the point cloud 502a also includes at least one texture attribute. A texture attribute can be a color. A color of a single point can be made from the combination of a red (R) value, a green (G) value, and a blue (B) value. The R value, the G value and the B value is referred to herein below as an RGB value. Additional texture attributes can include material properties, reflectiveness, motion, and the like. Due to the multitude of points (and the attributes associated with each point) that compose the point cloud 502a, transmitting the point cloud from a server that stores the point cloud 502a or an electronic device that created point cloud 502a significant bandwidth is needed. Therefore, to efficiently transmit the point cloud 502a from a first device to a second device, the point cloud 502a is decomposed and compressed.

The point cloud 502a is decomposed into various frames 510, such as a geometry frame 512 and a texture frame 514. In certain embodiments, under TMC2 each point cloud is decomposed into two geometry frames and two texture frames. The geometry frame 512 and the texture frame 514 include many patches, such as patch 516a and patch 516b, respectively. Each patch, such as patch 516a is generated by segmenting the points of the point cloud 502a. In particular, the point cloud 502a is segmented by clustering the 3-D points based on the normal vectors and a smoothness score. The clustered points are projected from 3-D space to the 2-D frame. Each projected cluster is called a patch. If a patch satisfies one or more geometric constraints such as cluster size, maximum depth range, and whether they project to same 2D location, the patch can be referred to as a regular patch. The regular patches are sorted and packed into separate frames where each frame represents an attribute such as the geometry frame 512 and the texture frame 514.

When projecting a patch to the geometry frame 512, the 2-D location of a point (a pixel in the 2-D frame) in a regular patch 516a plus a patch offset corresponds to two of the three spatial coordinates of the point in 3-D space. The third spatial coordinate of the point in 3D space is encoded as the value of the corresponding pixel in the 2-D image plus a patch-depth-offset. Each pixel in the geometry frame 512 has a corresponding pixel in the texture frame 514. In certain embodiments, the texture frame 514 represents the color of each corresponding point in the geometry frame 512. The offset can be a 3-D vector that contains different values along the X, Y, and Z coordinates.

In certain embodiments, an occupancy map is generated. The occupancy map indicates whether a pixel in the geometry frame 512, as well as the corresponding texture frame 514, represents a valid 3-D point. The occupancy map can be losslessly coded by an encoder. During the decoding process, the occupancy map is used to retrieve and reconstruct the valid points that are included in each of the at least two frames 510. Further descriptions of the occupancy map are discussed below with respect to FIGS. 6A and 6B.

If one or more points overlap, the various surfaces or objects that are represented by the points that are overlapped can miss projection from 3-D space to 2-D frame. Therefore, when the at least two frames 510 are reconstructed at reconstruction 540, the point cloud 502b will be reconstructed with holes corresponding the points that were skipped in the projection. For example, a 3-D object, represented by a point cloud, can have various portions of the point cloud that overlap. Projecting each point of a point cloud onto a 2-D frame is disrupted, if there are multiple overlapping points in a point cloud. The points that are occluded and then left off of the projection leads to holes in the point cloud when the point cloud is reconstructed. The points of the point cloud that are overlapped by an outer portion of the point cloud may not appear on a projection as the multiple points that exist along the same geometric axis has the same 2-D pixel location in the geometry frame 512.

Therefore missed points patch 518a and a missed points patch 518b are generated and included in the at least two frames 510. The missed points patch 518a (corresponds the geometry of the missed points) and a corresponding missed points patch 518b (corresponds to the texture of the missed points). The missed points patch 518a and the missed points patch 518b can be generated by reconstructing a point cloud (in the encoder based on the projected patches that are included in the at least two frames 510) and comparing the reconstructed point cloud against the inputted point cloud 502*a* to find one or more missed-points. In certain embodiments, the missed points can be detected using a K-D tree nearest neighborhood search. When missed points are found, the missed points are grouped together to form one or more missed points patches. In particular, the geometric coordinates are used to generate the missed points patch 518*a*, and the texture associated with each point is used to generate the missed points patch 518*b*. In certain embodiments, the missed points patch is non-structured, as depicted by the missed points patches 518*a* and 518*b*.

When the frames are generated, video codec 520 compresses the frames to generate the encoded bitstream 525. The video codec 520 can be HEVC, AVC, VP9, VP8 JVET, and the like. The encoded bitstream 525 is transmitted from an encoder to a decoder. The decoder can be a user equipment, such as a HMD 116 of FIG. 1. The encoded bitstream 525 is decompressed by video codec 530, to generate decoded bitstream 535. Thereafter, reconstruction 540 reconstructs and renders the point cloud 502*b*. The point cloud 502*b* is a reconstructed representation of the point cloud 502*a* on different device. Under lossy coding, the point clouds 502*a* and 502*b* are visually similar, but are not identical. Under lossless coding, the point clouds 502*a* and 502*b* are identical. For example, the point cloud 502*a* is received by an encoder, that generates and transmits an encoded bitstream, and the point cloud 502*b* is the point cloud 502*a* that is received, reconstructed, and rendered to be viewed a user at the decoder.

Figure 6A:
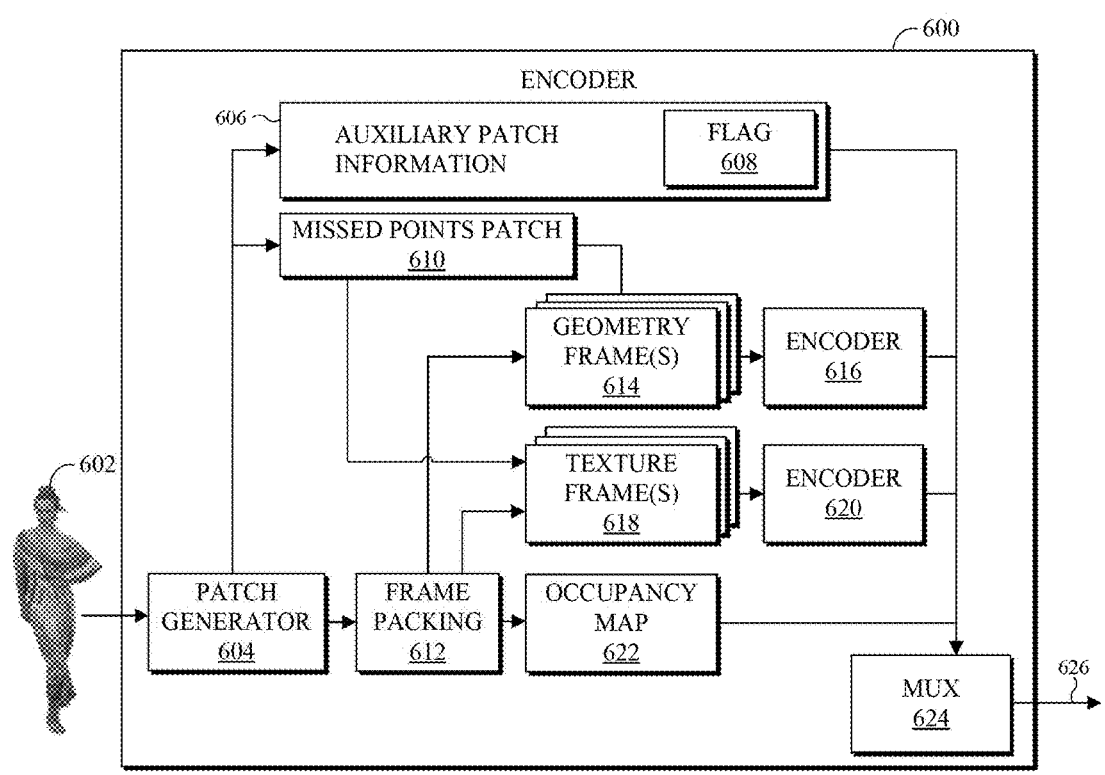
FIG. 6A illustrates an example block diagram of an encoder in accordance with an embodiment of this disclosure.
Figure 6B:
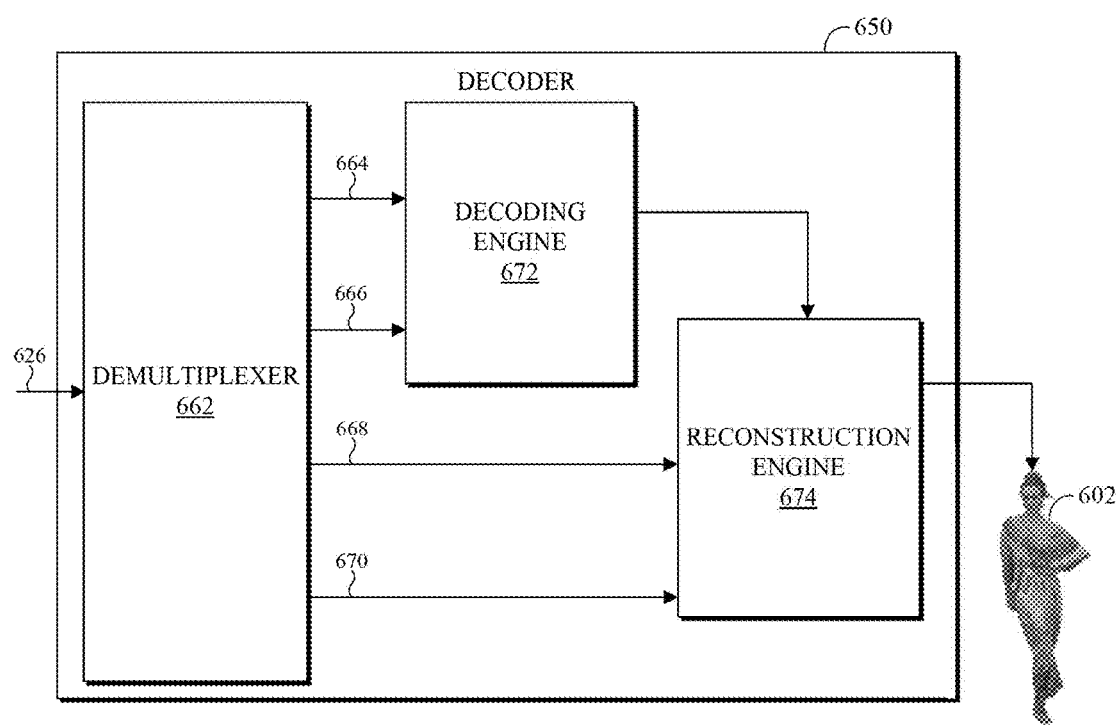
FIG. 6B illustrates an example block diagram of a decoder in accordance with an embodiment of this disclosure.

FIG. 6A illustrates an example block diagram of an encoder 600 in accordance with an embodiment of this disclosure. FIG. 6B illustrates an example block diagram of a decoder 650 in accordance with an embodiment of this disclosure. The encoder 600 can be similar to the server 104 of FIG. 1, any of the client devices 106-116 of FIG. 1, and include internal components similar to the server 200 of FIG. 2, and the electronic device 300 of FIG. 3. The decoder 650 can be similar to any of the client devices 106-116 of FIG. 1 and include internal components similar to the electronic device 300 of FIG. 3. The encoder 600 can communicate via network 102 to the decoder 650. The embodiment of the encoder 600 and the decoder 650 are for illustration only. Other embodiments could be used without departing from the scope of the present disclosure.

The encoder 600 can compress, encode, and transmit a point cloud, a mesh, or both, as an encode bitstream, similar to the encoded bitstream 525 of FIG. 5. In certain embodiments, the encoder 600 generates multiple 2-D frames in which a point cloud or a mesh is mapped or projected onto. For example, the point cloud is unwrapped and mapped onto multiple 2-D frames. For example, the point cloud can be unwrapped along one axis (such as the Y-axis), and the image is mapped along the remaining axis (such as X and Z axis). In certain embodiments, the encoder 600 generates an occupancy map (such as the occupancy map 622) that indicates where each pixel of the point cloud is located when the point cloud is mapped onto the 2-D frame. For example, the occupancy map indicates valid points and invalid points of each frame. The invalid points are locations of the frame that does not correspond to a point of the point cloud, whereas a valid point is a location of the frame that corresponds to a point in the 3-D point cloud. In certain embodiments, encoder 600 is a web server, a server computer such as a management server, or any other electronic computing system capable of, mapping the three dimensions of a point cloud into two dimensions, compressing frames, and encoding images for transmission. In certain embodiments, the encoder 600 can be a "cloud" of computers interconnected by one or more networks, where each is a computing system utilizing clustered computers and components to act as a single pool of seamless resources when accessed through network 102 of FIG. 1.

The decoder 650 can decode, decompress, and generate a received encoded bitstream (such as the encoded bitstream 525 of FIG. 5) that includes a representation of a point cloud, a mesh, or both. In certain embodiments, the decoder 650 generates multiple point clouds from a received bitstream that includes multiple 2-D frames. For example, each of the pixels of the point cloud can be mapped based on the information received in the 2-D frames and a received occupancy map.

The encoder 600 illustrates a high-level overview of an embodiment of the present disclosure of an electronic device that encodes and compresses a point cloud for transmission. In certain embodiments, the encoder 600 packages a point cloud for transmission by a bitstream to one or more decoders (such as the decoder 650). The encoder 600 includes a received point cloud 602, a patch generator 604, an auxiliary patch-information 606, a missed points patch 610, frame packing 612, various frames (such as one or more geometry frames 614 and one or more texture frames 618), an occupancy map 622, various encoders (such as encoder 616 and encoder 620), and a multiplexer 624.

Point cloud 602 represents the input into the encoder 600. The point cloud 602 can be stored in memory that is associated with the encoder 600. The patch generator 604 decomposes the point cloud 602 and creates multiple patches. The patches can be organized by an attribute. For example, the attributes can include geometry and a texture. Geometry is the geographic location of each point of the point cloud 602. Texture represents various aspects of each point of the point cloud 602, such as color, intensity, normal, reflection, and the like. The patch generator 604 clusters geometry attributes and texture attributes. The clustering can be based on a criteria such as a normal direction, distance to projected frames, contiguity, and the like. Each generated cluster is represented as a patch, as described above with respect to the at least two frames 510 of FIG. 5.

In certain embodiments, the patch generator 604 projects and maps the points of the point cloud onto 2-D frames via a one-to-one mapping. In certain embodiments, the patch generator 604 projects and maps the points of the point onto 2-D frames via projecting the points onto different planes. In certain embodiments, projecting and mapping the points of a point cloud onto 2-D frames can be based on a raster scan mapping, mapping based on the X geometric coordinate, mapping based on the Y geometric coordinate, mapping based on the Z geometric coordinate, mapping based on color, mapping based on normal direction, and the like.

In certain embodiments, the after projecting and mapping the points of the point cloud onto the 2-D frame, the points can be sorted and packed in the 2-D frame to increase coding efficiency. The frame packing 612 sorts and packs the points within a patch. In certain embodiments, the encoder 600 can also include a sorting engine (not shown) that places neighboring points and points that include spatially correlated data adjacent to each other.

The patch generator 604 also generates the auxiliary patch-information 606. The auxiliary patch-information 606 is information that is associated with each generated patch. In certain embodiments, the auxiliary patch-information 606 is metadata about the patches. For example, every patch has associated with it, auxiliary information such as (i) spatial position offsets, (ii) depth offset, (iii) location of patch in the video frame, (iv) size of the patch (such as the height and width of the patch), (v) index of projection plane, and the like. The auxiliary patch-information 606 is used by the decoder, such as the decoder 650, to reconstruct the point cloud.

In certain embodiments, during lossless coding, a large number of small patches can be generated by the patch generator 604 if a missed points patch is not used. The large number of patches increases the information within the auxiliary patch-information 606. The increased information within the auxiliary patch-information 606 can adversely affect the video coding efficiency thereby impacting performance of the point cloud compression.

In certain embodiments, the auxiliary patch-information 606 includes a flag 608. In certain embodiments, the flag 608 is omitted. The flag 608 can indicate the existence of the missed points patch 610 that is packed within the various frames, such as the one or more geometry frames 614 and the one or more texture frames 618. For example, if the patch generator 604 generates the missed points patch 610, then flag 608 within the auxiliary patch-information 606 indicates to the decoder (such as the decoder 650) information associated with the missed points patch 610. In certain embodiments, the flag 608 indicates the lossless coding. For example, under lossless coding, a missed points patch is included in each of the frames.

The auxiliary patch-information 606, the flag 608, or both, can include information associated with the missed points patch 610. For example, the information can include (i) the location of the missed points patch within a frame (such as the one of the geometry frames 614), (ii) the dimension or size location of the missed points patch, (iii) the number of missed points included in the missed points patch, and the like. In certain embodiments, the information associated with the missed points patch 610 is added at the end (or the beginning) of a list of patch information of the regular patches that is included in the auxiliary patch-information 606. For example, the location (such as the end or the beginning) in the list of patch information, included in the auxiliary patch-information 606, is used to identify the information that corresponds to the missed points patch 610.

In certain embodiments, the patch generator 604 can generate the missed points patch 610. The missed points patch 610 can represents a patch of additional points of the 3-D point cloud. It is noted that as used herein, the missed points patch 610 can be refer to as an additional points patch, as the missed points patch 610 can include both (i) points that are missed when the 3-D point cloud is projected onto 2-D frames, or (ii) points that belong to one or more regions of interest in the point cloud. Additionally, these additional points could be included in the missed points patch to facilitate encoding of these points using different quality than the regular patches.

The missed points patch 610 can include overlapping points of the 3-D point cloud. For example, the missed points patch 610 is created comparing a (i) new point cloud that is generated from the points in the regular patches following 3-D to 2-D projection (such as the one or more geometry frames 614 or the one or more texture frames 618, or both) against (ii) the input point cloud 602. The comparison can use a K-D tree nearest neighborhood search. The missed points are grouped together to form the missed-points-patch. The missed points patch 610 represents multiple missed points of the point cloud 602. A missed points patch is generated for each cluster of points that is missed. Alternatively, a missed points patch can include in a single patch each point that is missed. Additionally, for each cluster of points, a patch is created that corresponds to each attribute such as the geographic location of each point, and the various textures that are associated with each point.

The missed points patch 610, such as an additional points patch, can represent regions of interest. For example, the missed points patch 610 can include points that belong to a salient or important portion of the point cloud. Salient or important portion of the point cloud can be identified by a creator of the point cloud. Example portions of a point cloud can be the eyes, noise, or mouth in a humanoid type point cloud.

The missed points patch 610, such as an additional points patch, can represent a color metric or a geometry metric. A color metric can be based on the uniformity of color. A geometry metric can be based on proximity to certain area of the 3-D point cloud.

The missed points patch 610, such as an additional points patch, can represent one or more missed points. The points can be missed if the points did not satisfy a criteria associated with the projecting the 3-D point cloud on to the 2-D frame. For example, if one or more points are isolated from the main portion of the point cloud, the isolated points can be missed, even if the isolated points do not overlap any portion of the point cloud itself.

In certain embodiments, arranging and storing the missed points in the missed points patch is dependent on the frame format. In certain embodiments, the encoder 600 stores residual values instead of the original values of the missed points patch 610. That is, the encoder 600 stores residuals in the missed points patch 610 instead of original coordinate values, which can improve compression efficiency. Instead of storing the coordinate values of the missed points, residuals obtained from some form of differential coding of the geometric values of the missed points are stored within the missed points patch 610. For example, storing first differences (DPCM) values in the missed points patch 610 that represent the missed points that can increase the compression efficiency of the missed points patch. In certain embodiments, the residuals are obtained by taking sample wise differences of the values in the missed points patch 610. It is noted that the original values of the missed points are reconstructed at the decoder, such as the decoder 650.

The frame packing 612 sorts and packs the patches into the one or more geometry frames 614 and the one or more texture frames 618. The geometry and texture information corresponding to the patches generated by the patch generator 604 are packed into separate video frames, such as the one or more geometry frames 614 and the one or more texture frames 618. In certain embodiments, the frame packing 612 creates the one or more geometry frames 614 and the one or more texture frames 618. The frame packing 612 also determines the height and width of the frame based on how the patches are arranged and packed into a frame. The regular patches are arranged to occupy minimum space in a frame. That is, the size of the frame is determined based on the location of each patch, within the frame. Therefore, the frame is the smallest possible size based on how the patches are oriented and positioned within the frame.

After the normal patches are arranged in a frame, such as the one or more geometry frames 614, the location and dimensions of the missed points patch 610 (that corresponds to the geometry) is determined based on the (i) number of missed-points, (ii) the dimensions of the video frame, (iii) the occupancy of the video frame, (iv) the frame format, and the like. In certain embodiments, the dimensions (such as the height, the width, or both) of the geometry frames 614 can be increased to accommodate a missed points patch 610 that is larger than the space available in the frame following the packing of the regular patches. The missed points patch 610, (that corresponds to the geometry) is then packed in the one or more geometry frames 614. The one or more texture frames 618 are organized similarly to that of the one or more geometry frames 614, respectively. In certain embodiments, the one or more texture frames 618 are generated before the geometry frame 614.

Figure 8A:
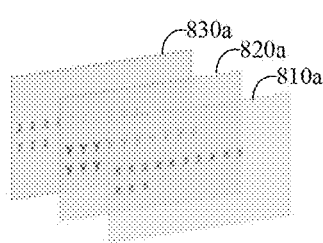
FIGS. 8A, 8B, 8C, and 8D illustrate example embedded missed points patches in accordance with an embodiment of this disclosure.
Figure 8B:
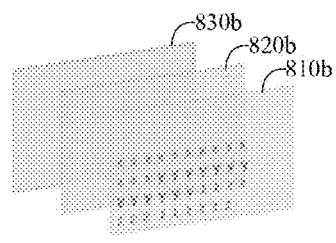

In certain embodiments, the arrangement and location of the missed points patch 610 within a frame (such as the geometry frame 614) is dependent on the frame format. For example, if the geometry frames 614 are based on a 4:4:4 format, then the X, Y, and Z coordinates of the missed points are directly stored in the Y, Cb, and Cr channels respectively. FIG. 8A, described below, illustrates the X, Y, and Z coordinates stored in the Y, Cb, and Cr channels. In another example, if the geometry frames 614 are based on a 4:2:0 format, then the X, Y, and Z coordinates of the missed points are grouped together with X values, followed by Y values, followed by Z values and stored in the Y channel. FIG. 8B, described below, illustrates the X, Y, and Z coordinates of the missed points are grouped together and stored in the Y channel.

In certain embodiments, the 4:2:0 format is used for texture video for lossy point cloud compression. In certain embodiments, 4:4:4 format is used for texture video for lossless point cloud compression.

The frame packing 612 also creates the occupancy map 622. The occupancy map indicates the pixel location in the frames (such as the one or more geometry frames 614 and the one or more texture frames 618) that contain valid points of the point cloud that are projected or mapped onto the respective frames. For example, the occupancy map 622 indicates whether each pixel on each frame (such as the one or more geometry frames 614 and the one or more texture frames 618) is a valid pixel or blank. A valid pixel on the occupancy map indicates a pixel on the 2-D frame that corresponds to a 3-D point in the point cloud. In certain embodiments, the occupancy map 622 can be the same for each frame, such as the one or more geometry frames 614 and the one or more texture frames 618. In certain embodiments, the occupancy map 622 represents multiple occupancy maps, where each occupancy map corresponds to one frame (such as the one or more geometry frames 614 and the one or more texture frames 618). The occupancy map 622 can be included in another frame, similar to that of the one or more geometry frames 614 or the one or more texture frames 618. In certain embodiments, the occupancy map 622 can be transmitted as metadata as a separate bitstream.

The one or more geometry frames 614 and the one or more texture frames 618 are encoded via encoder 616 and encoder 620, respectively. In certain embodiments, the auxiliary patch-information 606, the occupancy map 622, or both, are encoded as well. Thereafter, the auxiliary patch-information 606, the encoded one or more geometry frames 614 and the encoded one or more texture frames 618, and the occupancy map 622 are multiplexed via multiplexer 624. The multiplexer 624 combines the auxiliary patch-information 606, the encoded one or more geometry frames 614, the encoded one or more texture frames 618, and the occupancy map 622 to create a single encoded bitstream 626. In certain embodiments, the encoder 616 that encodes the one or more geometry frames 614, the encoder 620 that encodes the one or more texture frames 618, or both, can be configured to support either a 8-bit, a 10-bit, a 12-bit, a 14-bit, or a 16-bit, precision of data. In certain embodiments the encoder 616 and the encoder 620 are the same component, such that the one or more geometry frames 614 and the one or more texture frames 618 are encoded by the same encoder.

In certain embodiments, the missed points patch is packed beside the regular patches of the video frame. For example, the data representing geometry of the missed points patch is packed into the geometry frame and data representing a texture is packed into a corresponding texture frame. In certain embodiments, the missed points patch is directly multiplexed in the bitstream. Directly multiplexing the missed points patch into the bitstream is referred to as direct multiplexing. That is, instead of embedding the missed-points into video frames (such as the one or more geometry frames 614 and the one or more texture frames 618) and using the video codec (such as encoders 616 and 620) for compression of the missed-points. The coordinate values of these points are compressed and directly multiplexed into the bitstream. Compressing the coordinate values can be performed using Huffman coding, Arithmetic coding, DPCM based techniques, and the like. It is noted that at the decoder (such as the decoder 650 of FIG. 6B) the bitstream is decompressed and the missed points are reconstructed along with the regular points. FIG. 8D, discussed in greater detail below, illustrates the missed points that are multiplexed into the bitstream. For example, the multiplexer 624 multiplexes the encoded one or more geometry frames 614, the encoded one or more texture frames 618, and the missed points patch. The multiplexer 624 can also multiplex the encoded one or more geometry frames 614, the encoded one or more texture frames 618, the missed points patch, the occupancy map 622 and the auxiliary patch-information 606. In certain embodiments, the missed points patch 610 is encoded in the auxiliary patch-information 606.

Encoders 616 and 620 can include lossy point cloud compression or lossless point cloud compression. If lossy point cloud is used, the occupancy map 622 is included in the bitstream and transmitted to the decoder (such as the decoder 650). The decoder uses the occupancy map 622 to identify valid points in each frame, such as the one or more geometry frames 614 and the one or more texture frames 618. If lossless compression is used to compress the frames (such as the one or more geometry frames 614) the decoder 650 can derive the valid points directly from the one or more geometry frames 614. For example, the decoder 650 can use the one or more geometry frames 614 in a similar manner as it would the occupancy map 622. As a result, the occupancy map 622 can be excluded from the bitstream to improve the compression ratio. To remove the occupancy map 622 from the bitstream, the multiplexer 624 does not multiplex the occupancy map 622 with the encoded one or more geometry frames 614 (from the encoder 616), the encoded one or more texture frames 618 (from the encoder 620) and the auxiliary patch-information 606.

A bounding box can be utilized to indicate the location of the missed points patch 610 within a video frame, such as the one or more geometry frames 614 and the one or more texture frames 618. For example, the coordinates (u0, v0) can indicate the top-left coordinate of the bounding box containing the missed points patch 610. Similarly, the coordinates (u1, v1) can indicate the bottom-right coordinate of the bounding box containing the missed points patch 610. In another example, coordinates of a 2-D bounding box are encoded as (u0, v0) and (w, h), where w is the width of the bounding box and h is the height of the bounding box. That is, while (u0, v0) and (u1, v1) can indicate the top-left and bottom-right coo coordinate of the bounding box to describe the location of the bounding box, (u0, v0) and (w, h) describe the starting coordinate and provide the height and width of the bounding box.

In certain embodiments, the location of the bounding box of the missed points patch(es) along with the dimensions are sent to the decoder on a per-frame basis. The bounding box of the missed points can be included in the auxiliary patch-information 606. When the geometry and texture frames are received by a decoder (such as the decoder 650, described in greater detail below in FIG. 6B) the X, Y, and Z coordinates and the texture information are retrieved from the missed points patches in the respective frames based on the information of the location and size (such as width and height) of the missed points patch (included in the auxiliary patch-information 606) and the occupancy map. In certain embodiments, the occupancy map does not retrieve the missed points if the number of missed points and a bounding box information is transmitted from the encoder to the decoder within the auxiliary patch-information 606.

The decoder 650 illustrates a high-level overview of an embodiment of the present disclosure of an electronic device that decodes and reconstructs a point cloud for rendering. In certain embodiments, the decoder extracts the compressed geometry and attributes from the bitstream 626. In certain embodiments, the decoder 650 maps the geometry and attribute to generate the point cloud 602. The decoder 650 includes a demultiplexer 662, a decoding engine 672, and a reconstruction engine 674. In certain embodiments, the decoder 650 includes two or more decoding engines 672. To reconstruct the 3-D point cloud the decoder uses information within the patches of the various video frames (such as the one or more geometry frames 614 and the one or more texture frames 618), patch metadata (such as included in the auxiliary patch-information 606, and the occupancy map 622.

The decoder 650 receives the encoded bitstream 626 that originated from the encoder 600. Upon receiving the encoded bitstream 626, the demultiplexer 662 separates various streams of data from the encoded bitstream 626. For example, the demultiplexer 662 separates various streams of data such as the geometry frame information 664 (originally the one or more geometry frames 614 of FIG. 6A), texture frame information 666 (originally the one or more texture frames 618 of FIG. 6A), the occupancy map information 668 (originally the occupancy map 622 of FIG. 6A), and the auxiliary patch information 670 (originally the auxiliary patch-information 606 of FIG. 6A).

For example, the demultiplexer 662 demultiplexes the encoded bitstream 626 into separate compressed bitstreams for point cloud geometry (such as the geometry frame information 664 from the one or more geometry frames 614), color (such as the texture frame information 666 from the one or more texture frames 618), attribute (such as the texture frame information 666 from the one or more texture frames 618), occupancy map (such as the occupancy map information 668), and metadata. The bitstream for geometry and the bitstream for color are decoded, via the decoding engine 672, to generate the 2-D video frames for geometry and color.

In certain embodiments, the decoding engine 672 decodes the geometry frame information 664 and the texture frame information 666 to generate the corresponding 2-D frames, that of the one or more geometry frames 614 and the one or more texture frames 618 of FIG. 6A. In certain embodiments, each of the various bitstreams, or streams of data, (such as the geometry frame information 664, the texture frame information 666, the occupancy map information 668, and the auxiliary patch information 670) are each transmitted decoded by the decoding engine 672. In certain embodiments, separate, parallel decoding engines similar to the decoding engine 672, can process each received stream. If a portion of the various streams of data were encoded (such as the geometry frame information 664) then the geometry frame information 664 is decoded by the decoding engine 672. The occupancy map information 668 indicates the valid pixel location within the 2-D frames to reconstruct the point cloud 602. The decoding engine 672 decompresses the various data streams. In certain embodiments, decoding engine 672 can be lossless or lossy. In certain embodiments, the decoding engine 672 can reconstruct the signal from the lossy or losslessly encoded bitstream.

In certain embodiments, the identification of the missed points and generation of the missed points patch is used for lossless compression.

The reconstruction engine 674, reconstructs the 3-D point cloud based on the data received from the demultiplexer 662, or the decoding engine 672. The locations and dimensions of the regular patches are retrieved from the decoded auxiliary patch information 670. For example, the points are reconstructed from the regular patches by adding the patch offsets (from decoded auxiliary patch information 670) to the spatial location of the points in the video and adding depth offset of the patch to the value of the pixel at the spatial location. The reconstruction engine 674 can reconstruct the point cloud based on lossy, or lossless coding.

In certain embodiments, the reconstruction engine 674 detects whether the flag 608 is included in the auxiliary patch information 670. The flag 608 indicates whether a missed points patch is included in the frames (such as the geometry frame information 664), directly multiplex, or the like. In certain embodiments, auxiliary patch information 670 can also include a 'patch_direct_coding,' which can either indicate information about the missing points patch or be binary value, such as 1 or 0 that used to indicate whether the patch contains directed coded point cloud data. For example, the 'patch_direct_coding' can indicate whether the missed points patch 610 is directly coded information that is transmitted along with the other patch information, that of direct multiplexing. In another example, the 'patch_direct_coding' may not be binary, and can indicate (i) the index of the projection plane, (ii) information concerning the 2-D bounding box, (iii) the 3-D location of the missing points patch 610.

Based on the format of the 2-D video frames, the reconstruction engine 674 changes how it reconstructs the point cloud. For example, if the geometry video format (based on the geometry frame information 664) is 4:4:4, then the coordinate values are directly retrieved from the patch in the three color channels. The patch can be located from the decoded auxiliary patch information of the missed-points-patch. In certain embodiments, the auxiliary patch information 670 of the missed-points-patch is retrieved from the list of auxiliary patch information 670 identified by its position, such as the last position.

In another example, if the geometry video format (based on the geometry frame information 664) is 4:2:0, then the reconstruction engine 674 first identifies the number (such as the quantity) of missed points that are included in the missed points patch. Thereafter the reconstruction engine 674 retrieves coordinate values from the Y channel. In certain embodiments, the number of missed points is determined at the decoder 650 with the aid of the occupancy map information 668 corresponding to the missed points patch. In certain embodiments, the information about the number of missed points is stored in the auxiliary patch information 670 of the missed-points-patch and retrieved at the decoder 650.

An example syntax is provided below to illustrate reconstructing a point cloud. In the example syntax below, np is the running counter of decoded points. The syntax is used with respect to all patches included in the frames.

---
Syntax 1:
---
```
if(projection_plane_index = XY plane)
{
  for(row = u0;row <= u1;row++)
  {
    for(col = v0;col <= v1;col++)
    {
      if(occupancy_map[row][col] == 1)
      {
        point[np].x = col+x0
        point[np].y = row+y0
        point[np].z = image_geo[row][col].y + z0
        point[np].r = image_color[row][col].r
        point[np].g = image_color[row][col].g
        point[np].b = image_color[row][col].b
        np++;
      }
    }
  }
}
else if(projection_plane_index = YZ plane)
{
  for(row = u0;row <= u1;row++)
  {
    for(col = v0;col <= v1;col++)
    {
      if(occupancy_map[row][col] == 1)
        point[np].y = col+y0
        point[np].z = row+z0
        point[np].x = image_geo[row][col].y + x0
        point[np].r = image_color[row][col].r
        point[np].g = image_color[row][col].g
        point[np].b = image_color[row][col].b
        np++;
      }
    }
  }
}
else if(projection_plane_index = XZ plane)
{
  for(row = u0;row <= u1;row++)
  {
    for(col = v0;col <= v1;col++)
    {
      if(occupancy_map[row][col] == 1)
        point[np].x = col+x0
        point[np].z = row+z0
        point[np].y = image_geo[row][col].y + y0
        point[np].r = image_color[row][col].r
        point[np].g = image_color[row][col].g
      point[np].b = image_color[row][col].b
      np++;
      }
    }
  }
}
```
---

Syntax 1 illustrates reconstructing the point cloud by the decoder, such as decoder 650. The term 'projection_plane_index' represents the index of the projection plane. The coordinates '(u0, v0, u1, v1)' described the coordinates of the 2-D bounding box containing the patch. The coordinates '(x0, y0, z1)' represent the 3-D location of the patch. The term 'occupancy_map,' is occupancy map. The 'image_geo' is the decoded geometry video frame. The 'image_color' is the decoded color video frame. The 'point' is the output point cloud.

Example syntax is provided below to illustrate reconstructing a point cloud that includes the 'patch_direct_coding,' described above. In the example syntax below, np is the running counter of decoded points. The syntax is used with respect to all patches included in the frames.

---
Syntax 2:
---
```
if(patch_direct_coding = 0)
{
  // Use Syntax 1
}
else
{
  for(row = u0;row <= u1;row++)
  {
    for(col = v0;col <= v1;col++)
    {
      if(occupancy_map[row][col] == 1)
      {
        point[np].x = image_geo[row][col].y + x0
        point[np].y = image_geo[row][col].u + y0
        point[np].z = image_geo[row][col].v + z0
        point[np].r = image_color[row][col].r
        point[np].g = image_color[row][col].g
        point[np].b = image_color[row][col].b
        np++;
      }
    }
  }
}
```
---

In the above example, syntax 2 illustrates reconstructing the point cloud by the decoder, such as decoder 650. In particular if the variable 'patch_direct_coding' is set to zero, then the missed points patch 610 was not directly coded into the bitstream, and Syntax 1, is used. Similar to Syntax 1, the term 'projection_plane_index' represents the index of the projection plane. The coordinates '(u0, v0, u1, v1)' described the coordinates of the 2-D bounding box containing the patch. The coordinates '(x0, y0, z1)' represent the 3-D location of the patch. The term 'occupancy_map,' is occupancy map. The 'image_geo' is the decoded geometry video frame. The 'image_color' is the decoded color video frame. The 'point' is the output point cloud.

In certain embodiments, the encoder 600 of FIG. 6A allocates bits between different attributes of a point cloud. The encoder 600 can include a bit allocation engine (not shown) and a decision engine (not shown). For example, the patch generator 604 of the encoder 600 can generate metadata. The metadata is transmitted from the patch generator 604 to the multiplexer 624. The multiplexer 624 then multiplexes the metadata into the compressed bitstream that is then transmitted to the decoder 650. The bit allocation engine allocates an importance factor to particular aspects of the point cloud. For example, if the point cloud is of a human, the face and hands are allocated with a higher importance value than other parts of the point cloud. Depending on the characteristics of the point cloud various features or elements of the point cloud can be allocated to a higher importance value. The decision engine is a closed loop decision element that is part of the encoder 600. The decision engine evaluates errors, gaps, holes and the like. For example, the decision engine modifies the projection, mapping, and other parameters in order to minimize the presence of errors, gaps, holes or the like when the point cloud is projected by the patch generator 604. Based on the allocation engine and the decision engine, metadata is generated. The metadata can describe the type of protection and mapping. The metadata can also describe the type of sorting, packing and padding that is used when generating the regular patches and the missed points patches. The generated metadata is multiplexed by the multiplexer 624 and transmitted to the decoder 650 within the compressed bitstream 626.

The decoder 650 receives the compressed bitstream 626 and the demultiplexer 662 separates the metadata from the geometry frame information 664, the texture frame information 666, the occupancy map information 668, and the auxiliary patch information 670. The reconstruction engine 674 receives the metadata. The metadata is used to generate the 3-D point cloud form the various 2-D frames.

Figure 7A:
FIGS. 7A, 7B, 7C, and 7D illustrate an example 3-D point cloud and 2-D frames, including a missed points patch, that represent the 3-D point cloud in accordance with an embodiment of this disclosure.
Figure 7B:
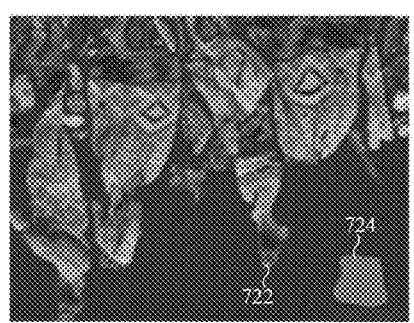
Figure 7C:
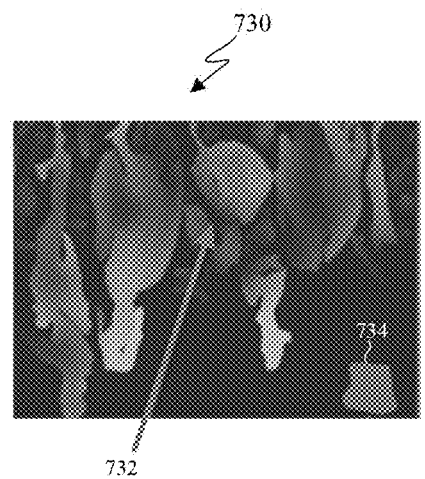
Figure 7D:
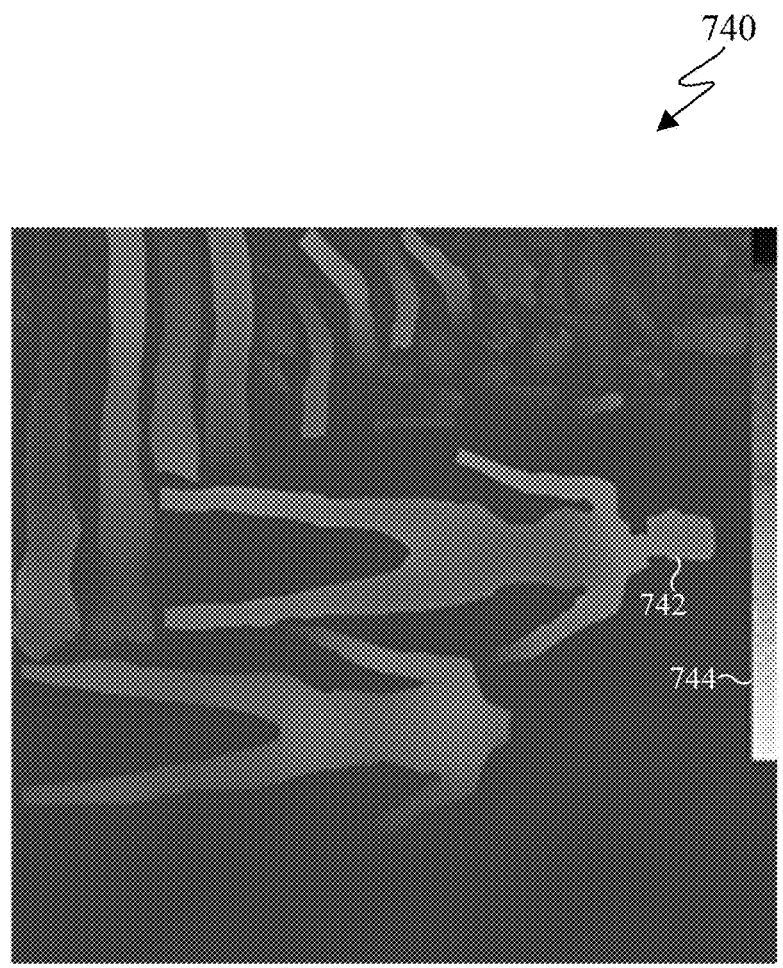

FIGS. 7A, 7B, 7C, and 7D illustrate an example 3-D point cloud and 2-D frames, including a missed points patch, that represent the 3-D point cloud in accordance with an embodiment of this disclosure. In particular, FIG. 7A illustrates a point cloud 710, and FIGS. 7B, 7C, and 7D illustrate and 2-D frames, including regular patches and a missed points patch. The embodiment of FIGS. 7A, 7B, 7C, and 7D are for illustration only and other embodiments could be used without departing from the scope of this disclosure.

The point cloud 710 is similar to the point cloud 405 of FIG. 4, the mesh 410 of FIG. 4, the point cloud 502a and 502b of FIG. 5, point cloud 602, of FIGS. 6A and 6B. The point cloud 710 is a set of data points in 3-D space. Each point of the 3-D point cloud includes (i) a geometric position that provides the structure of the 3-D point cloud and (ii) one or more textures that provide information about each point such as color, reflectiveness, material, and the like.

FIGS. 7B, 7C, and 7D illustrate the 2-D frames 720, 730, and 740 respectively. The frames 720, depicts regular patches (such as patch 722) representing the texture of the point cloud 710. The frame 730, depicts regular patches (such as patch 732) representing the depth values of the point cloud 710. The frames 720 and 730 can be similar to the one or more texture frames 618 and the one or more geometry frames 614 of FIG. 6A. The frame 720 and the frame 730 also include a missed points patch 724 and 734, respectively. The missed points patch 724 and 734 includes the overlapping points of the point cloud 710, that include the hard to project points bunched together to form a separate and an additional patch beyond the regular patches (such as 722 and 723, respectively) that are obtained from the 3-D to 2-D projection. In certain embodiments, missed points patch that is composed of the overlapping and hard to project points into blocks are a predetermined size that is used in a block based video codec. In certain embodiments, the missed points patch 724 and 734 can include the 'patch_direct_coding' variable set to 1.

FIG. 7D illustrates regular patches 742 and a missed points patch 744. The regular patches 742 of frame 740 represent a different point cloud than the point cloud 710. The frame 740 can be similar to the one or more geometry frames 614 or the one or more texture frames 618 of FIG. 6A. Even though the frame 740 represents a different point cloud than the frames 720 and 730, the frame 740 illustrates another placement location of the missed points patch, such as the missed points patch 744.

Generally, the missed points patch, such as the missed points patch 724, 734, and 744 are packed into the video frames, such as the frames 720, 730, and 740, where each frame can represent geometry, texture, and any other attribute. The location of the missed points patch 724 and 734 is positioned in a location within the frame. The location of the missed points patch 744 is positioned on the other edge of the frame 740. In another example, missed points patches can be placed in a frame relative to the regular patches in the video frame such as positioned (i) on the left of the frame, (ii) on the right of the frame, (iii) on the top of the frame, (iv) on the bottom of the frame, (v) within the middle of the frame (in a location that does not overlap any of the regular patches), and (vi) other positions known by those skilled in the art.

Example syntax is provided below to illustrate determining the location of the missed points patch within a frame. The regular patches are projected and onto a frame. A corresponding occupancy map illustrates the valid locations of pixels that are included in the frame. Thereafter, the occupancy map and video frame can be divided into a square grid of a predetermined size, such as 'occupancyResolution×occupancyResolution' to aid in the placement of the patches and valid point indicators within the video frame and the occupancy map respectively. The syntax below includes the assumption that the regular patches are packing into the video frame (such as by the frame packing 612 of FIG. 6A) and the occupancy map indicates the locations of the valid points of the regular patches.

Syntax 3:

```
// maxOccupancyRow = maximum row number (in units of occupancyResolution) occupied
//         by regular patches in the existing occupancy map
missedPointsPatch_v0 = maxOccupancyRow;    // starting row of the missedPointsPatch
missedPointsPatch_u0 = 0;         // starting col of the missedPointsPatch
// total number of blocks required for storing the missed points
missedPointsPatchBlocks = ceil(numberOfMissedPoints /
                (occupancyResolution * occupancyResolution));
// rows (in units of occupancyResolution) needed for embedding missedPointsPatch
missedPointsPatchBlocksV = ceil(missedPointsPatchBlocks / occupancySizeU);
// rows (in units of occupancyResolution) to add to existing occupancy map
occupancyRows2Add = maxOccupancyRow + missedPointsPatchBlocksV - occupancySizeV;
occupancyRows2Add = occupancyRows2Add > 0 ? occupancyRows2Add : 0;
occupancySizeV += occupancyRows2Add;
// mppOccupancyMap is a 1-D vector of the occupancy map corresponding to the
// missedPointsPatch
bool mppOccupancyMap[occupancySizeU * occupancySizeV];
// columns (in units of occupancyResolution) needed for embedding missedPointsPatch
missedPointsPatchBlocksU    =    ceil(missedPointsPatchBlocks    /    missedPointsPatchBlocksV);
missedPointsPatch_sizeV = missedPointsPatchBlocksV * occupancyResolution;
```

-continued

Syntax 3:

```
missedPointsPatch_sizeU       =       ceil(numberOfMissedPoints       /
missedPointsPatch_sizeV);
infiniteValue = 65536;
missedPointsPatch.resize(missedPointsPatch_sizeU  *  missedPointsPatch_sizeV,
infiniteValue);
// missedPointPatchOccupancy is a vector of bool for storing the valid point
indicator
bool        missedPointPatchOccupancy[missedPointsPatchBlocksU        *
missedPointsPatchBlocksV];
fill(missedPointPatchOccupancy, false);
//missedPointsPatch.x[i] contains actual x-coordinates fo the missed points
for (v = 0; v < missedPointsPatch_sizeV; ++v) {
  for (u = 0; u < missedPointsPatch_sizeU; ++u) {
    p = v * missedPointsPatch_sizeU + u;
    if (missedPointsPatch.x[p] < infiniteValue) {
      u0 = u / occupancyResolution;
      v0 = v / occupancyResolution;
      p0 = v0 * missedPointsPatchBlocksU + u0;
      missedPointPatchOccupancy[p0] = true;
    }
  }
}
// embed the occupancymap related to the missed points patch into the actual
occupancy map
for (v0 = 0; v0 < missedPointsPatchBlocksV; ++v0) {
  v = missedPointsPatch_v0 + v0;
  for (u0 = 0; u0 < missedPointsPatchBlocksU; ++u0) {
    u = missedPointsPatch_u0 + u0;
    mppOccupancyMap[v * occupancySizeU + u] =
      mppOccupancyMap[v * occupancySizeU + u] ||
      missedPointPatchOccupancy[v0 * missedPointsPatchBlocksU + u0];
  }
}
```

In certain embodiments, the location and the size of the missed points patch (such as the missed points patch 724) is added to a predetermined position within a frame. The location of the missed points patch within the frame can be added to a first position or a last position in the list of patch information that is sent to the decoder. The decoder (such as the decoder 650) knowing the position of the missed points patch within the list of patch information (such that the missed points patch is in the first position of the last position within the list of patch information), restores the points from the missed points patch to each of the points original position within the point cloud when the decoder reconstructs the point cloud.

Figure 8C:
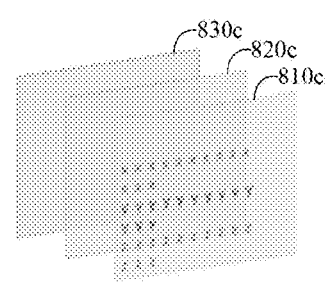
Figure 8D:
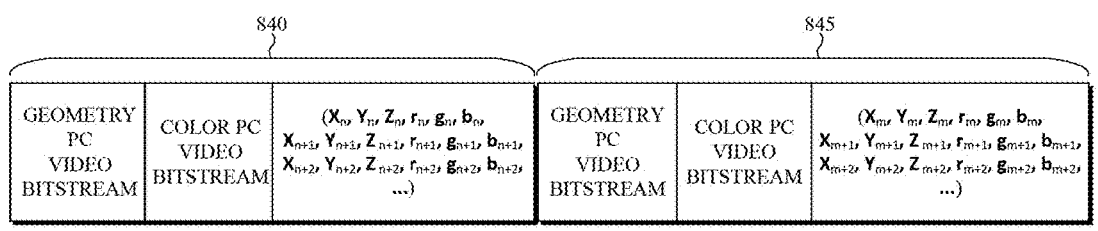

FIGS. 8A, 8B, 8C, and 8D illustrate example embedded missed points patches in accordance with an embodiment of this disclosure. FIGS. 8A, 8B, and 8C illustrate different arrangements of the missed points within a frame. FIG. 8D illustrates direct multiplexing the missed points patch into the bitstream that is transmitted from an encoder (such as the encoder 600) to a decoder (such as the decoder 650). The embodiment of the FIGS. 8A, 8B, 8C, and 8D are for illustration only. Other embodiments can be used without departing from the scope of the present disclosure.

FIG. 8A illustrates three frames, frames 810a, 820a and 830a. FIG. 8B illustrates three frames, frames 810b, 820b and 830b. FIG. 8c also illustrates three frames, frames 810c, 820c, and 830c.

FIG. 8A illustrates an example of how the missed points in the missed points patch can be stored in the three color frames of a 4:4:4 format. The three color frames can be Y, Cb, and Cr, which correspond to the frame 810a, 820a, and 830a, respectively. That is, the X coordinates are stored in the frame 810a, the Y coordinates are stored in the frame 820a, and the Z coordinates are stored in the frame 830a. It is noted that while the missed points patch stores coordinates directly into the three planes (that of the frames 810a, 820a and 830a), the regular patches, such as the regular patch 742 of FIG. 7D, store only depth value. The other two coordinates of a point included in a regular patch are deduced from each point's location within the regular patch, and any patch offset.

FIG. 8B illustrates an example of how the missed points in the missed points patch can be stored in the three color frames of a 4:2:0 format. The missed points patch is embedded in the luma plane, such as the frame 810b. An encoder (such as the encoder 600 of FIG. 6A) can encode the X-Coordinate, the Y-Coordinate, and the Z-Coordinate of each point in the missed points patch can be arranged and stored as a single patch. Thereafter a decoder (such as the decoder 650 of FIG. 6B) can decode and reconstruct from the knowledge of the number of missed points in the missed points patch.

In certain embodiments, an encoder stores all the X, Y, and Z coordinates together in a single missed points patch in a single luma plan, such as illustrated in FIG. 8B. The decoder retrieves from the patch the X, Y, and Z coordinates based on (i) the location of the patch in the frame, (ii) the dimensions of the patch, and (iii) the total number of missed points that are stored in the patch. The information (i) location, (ii) size, and (iii) number of points, can be sent from the encoder to the decoder in the bitstream as auxiliary patch information, such as the auxiliary patch-information 606 and the auxiliary patch information 670. In certain embodiments, the number of points that are included in the missed points patch can be derive by the decoder, instead of transmitted from the encoder. For example, the decoder can derive the number of missed points by summing the total number of valid points via the occupancy map that is associated with the missed points patch.

FIG. 8C illustrates another example of storing the missed points patch. The X-Coordinate, the Y-Coordinate, and the Z-Coordinate of each point in the missed points patch can be stored as three separate patches, in the frame 810c.

An example syntax is provided below to illustrate embedding the missed points patch in the video frame for a 4:2:0 and a 4:4:4 video frame format.

---

Syntax 4:

```
for (h = 0; h < missed_points_patch.height; ++h) {
  for (w = 0; w < missed_points_patch.width; ++w) {
    if (missed_points_patch.x[h, w])
    {
      x = (i + h);   // i is x-coordinate of the location of the patch in the video frame
      y = (j + w);   // j is y-coordinate of the location of the patch in the video frame
      video_frame(0, x, y) = missed_points_patch.x[h, w];
```

---

Syntax 4:

```
      if (format == "444") {
        video_frame(1, x, y) = missed_points_patch.y[h, w];
        video_frame(2, x, y) = missed_points_patch.z[h, w];
      }
    }
  }
}
```

---

FIG. 8D illustrates direct multiplexing of the missed points patch into the bitstream. The frame 840 includes a geometry point cloud video bitstream, a color point cloud video bitstream and the missed points patch. The missed points patch includes the X, Y, Z, R, G, B, geometry and texture. The next frame 845 also includes a geometry PC video bitstream, a color PC video bitstream and the missed points patch. The missed points patch includes the X, Y, Z, R, G, B, geometry and texture. The missed points coordinate values and texture values are directly multiplexed into the bitstream. Entropy coding such as Huffman coding, Arithmetic coding, DPCM-based coding, and the like can be used to code the points of the geometry, attributes, or both directing into the bitstream.

Example syntax is provided below to illustrate restoring the missed points patch in the video frame for a 4:2:0 or a 4:4:4 video frame format. If the format is 4:4:4, then the points in the missed points patch are stored in the three color planes as illustrated in FIG. 8A. If the format is a 4:2:0, then the points in the missed points patch are stored in a single patch and in a single video frame, as illustrated in FIG. 8B.

---

Syntax 5:

```
if (format == "444") {
  for (h = 0; h < missed_points_patch_height; ++h) {
    for (w = 0; w < missed_points_patch_width; ++w) {
      x = (i + h);   // i is x-coordinate of the location of the patch in the video frame
      y = (j + w);   // j is y-coordinate of the location of the patch in the video frame
      point.x = video_frame(0, x, y);
      point.y = video_frame(1, x, y);
      point.z = video_frame(2, x, y);
      add_to_reconstructed_point_cloud(point);
    }
  }
}
else{   // if (format == "420")
  points_added_count = 0;
  point3D points_vector[number_missed_points];   // array to hold 3D points
  for (h = 0; h < missed_points_patch_height; ++h) {
    for (w = 0; w < missed_points_patch_width; ++w) {
      x = (i + h);   // i is x-coordinate of the location of the patch in the video frame
      y = (j + w);   // j is y-coordinate of the location of the patch in the video frame
      if (occupancy_map[x, y]){
        if (points_added_count < number_missed_points){
          points_vector[points_added_count].x = video_frame(0, x, y);
        }
        else if (number_missed_points <= points_added_count < 2 * number_missed_points){
          points_vector[points_added_count - number_missed_points].y = video_frame(0, x, y);
        }
        else if (2 * number_missed_points <= points_added_count < 3 * number_missed_points){
          points_vector[points_added_count - 2*number_missed_points].z = video_frame(0, x, y);
          add_to_reconstructed_point_cloud(points_vector[points_added_count - 2*number_missed_points]);
        }
        points_added_count++;
      }
    }
  }
}
```

In the above example, the syntax 5 illustrates restoring the missed points patch, based on the format of the frame itself. The syntax 5 is a lossless point cloud compression.

In certain embodiments, a hybrid projection is used to generate the missed points patch. For example, the points that are initially missed, when the regular patches are generated by projecting the 3-D point cloud into the 2-D frame, are detected and grouped into the missed points patch. In order to group the missed points, a second point cloud can be constructed from the points included in the regular patches. Each point of the original point cloud is compared with the second point cloud. If a point is missing, in the second point cloud, then the corresponding point in the original point cloud is a missed point. Each missed point is then gathered to form the missed points patch. The missed points patch, as described above, stores the missed points.

In certain embodiments, instead of storing the X, Y, and Z coordinates values from the missed points patch into the video frame (either in all three channels or a single channel such as FIG. 8A as compared to FIG. 8B), residuals can be stored. The residuals, as discussed above, can be the difference of the X, Y, and Z coordinates values. Since the dynamic range and maximum value of the residual signal is lower than the original coordinate value, the lossless performance is increased. The residuals can be obtained by subtracting a predicated signal from the original signal. In one exemplary embodiment, the predicted signal is a sample-shifted version of the original signal.

The syntax below illustrates the process of residual generation and signal reconstruction. For example, X is a one-dimension array that contains the original coordinate values stacked one after another in a horizontal arrangement.

Syntax 6:

```
s = zeros(len(x))
for i in range(1, len(x)):
    s[i] = x[i−1]
// Generation of residual signal, r, at the encoder
r = zeros(len(x))
for i in range(0, len(x)):
    r[i] = x[i] − s[i]
// Reconstruction of original signal x_rec, at the decoder from the residual
signal, assuming the number of missed points, N, is also transmitted to
the decoder
x_rec = zeros(N)
csum = 0
for i in range(0, N):
    csum += r[i]
    x_rec[i] = csum
```

In certain embodiments, the residual values are stored directly in the video frames if the bit-depth of the video frame exceeds a required bit-depth to store the dynamic range of the residual values. For example, if the residuals are in the range of [−512, 511] and the bit-depth of the video frame is ten-bits, then the residuals can be directly stored in the ten-bit video frame, such that nine bits store the value and one bit stores the sign. In another example, if the bit-depth of the video frame is unable to store both the sign and the maximum value of the residuals, then only the absolute value is stored in the frame. The information about the location of negative residuals can be stored in a corresponding location in the occupancy map, such as the occupancy map 622. The sign can be encoded in the occupancy map 622 via a run-length coding, arithmetic coding, or the like. The syntax below illustrates the reconstruction of the residual sign form the occupancy map 622.

Syntax 7:

```
s = zeros(len(x))
for i in range(1, len(x)):
    s[i] = x[i−1]
// Generation of residual signal, r, and sign signal at the encoder
r = zeros(len(x))
for i in range(0, len(x)):
    r[i] = x[i] − s[i]
signs = zeros(len(x))
for i in range(0, len(x)):
    if r[i] < 0:
        signs[i] = 1
r = abs(r)
p = ones(N)
for i in range(0, N):
    if signs[i] == 1:
        p[i] = −1
x_rec = zeros(N)
csum = 0
for i in range(0, N):
    csum += r[i]*p[i]
    x_rec[i] = csum
```

In the syntax above, 's' is the generated signal from an original signal. 'N' is the number of missed points. To reconstruct the original signal x_rec, at the decoder from the absolute of residual signal, the sign signal is transmitted to the decoder.

In certain embodiments, raw bits are used to represent the signs that are embedded directly to the bitstream and sent separately from the occupancy map 622. For example, instead of storing the sign signal in the occupancy map 622, the signs can be embedded directly into the bitstream.

In certain embodiments, a dynamic range of values that is stored in the missed points patch is reduced by storing biased values (also referred to as offset values) instead of the original values. For example, the biased values can include X-X_min, Y-Y_min, Z-Z_min, and the original values are X, Y, and Z. Where X_min is the minimum value of all X-coordinate values, Y_min is the minimum value of all Y-coordinate values, and Z_min is the minimum value of all Z-coordinate values. The biased values X_min, Y_min, and Z_min can be sent from the encoder 600 to the decoder 650 in the encoded bitstream as batch information for each frame.

As described above, point clouds, similar to the point cloud 405 of FIG. 4, the mesh 410 of FIG. 4, the point clouds 502a and 502b of FIG. 5 the point cloud 602 of FIGS. 6A and 6B, the point cloud 710 of FIG. 7 use a large amount of bandwidth for transmission. Therefore, a point cloud is compressed to increase efficiency when the point cloud is transmitted. When a point cloud that is three-dimensional is projected onto a 2-D frame, the result of the projection can vary depending on the placement order of each point of the point cloud onto the 2-D frame. The varying arrangement and order of the points can affect the performance of the point cloud such as the compression of the point cloud, the transmission of the point cloud, and the reconstruction of the point cloud. To further improve the compression, transmission and reconstruction of the point cloud, re-ordering the input points can increase the performance of the point cloud. For example, the order of each point within a patch, such as a regular patch or a missed points patch, can affect the performance of the encoder 600, the decoder 650, and the transmission there-between.

For example, projecting the 3-D point cloud onto a 2-D frame, based on a number of regular patches and one or more missed points patch, can vary depending on the order in which the point points of the point cloud are stored in each frame. The order in which the points are stored, can direct affects performance of both the encoder 600 and the decoder 650. For instance, sorting the points in order to re-order the input points can directly affect the performance of both the encoder 600 and the decoder 650. Sorting the points can also increase smoother 2-D frames.

Depending on the projection method, a point cloud can be projected onto 2-D video frames in a (i) structured order, (ii) a non-structured order, or (iii) a semi structured order. In a structured order, all patches in the projected 2-D frames retain the structure of the point cloud. In a non-structured order, none of patches in projected 2-D frames retains the structure of the point cloud. In a semi-structured order, some patches retain the structure of the point cloud whereas some others do not. For example, the regular patches may retain the structure of the point cloud whereas the missed point patch may not. The performance of a non-structured or semi-structured projection method can be improved by reordering the points in the non-structured patches based on some sorting mechanisms such as minimum distance between points sorting order, a K-D tree sorting order, a depth first search (DFS) sorting order, or a breadth first search (BFS) sorting order.

Sorting can ensure that a point that are within a certain proximity of another point in the point cloud will be closer to each other when the 3-D point cloud is projected onto the 2-D frame. A proximity metric can sort the points of the projection based on different factors, such as geometrical distance, color similarity and the like. The geometrical distance can be the distance between points in the 3-D space. The color similarity can group similar colors. The color similarity can also group points of similar color intensity Sorting the points can be based on one or more of the attributes or a look up table. For example, sorting based on one attribute can then apply the same ordering to the other attributes. For instance, the points can be ordered using the geometry attribute to find an optimal order and then that same order is applied to the other attributes such as color. In another example, sorting based on two or more attributes, such as geometry and color, can apply the same ordering to any other attributes. In another example, a look up table can be generated to match the attributes to a particular sorting order.

Projecting points in a non-optimal order can store each attribute of the point cloud in a non-structural way. For example, an attribute values can be added sequentially to a rectangular region on a 2-D frame in a row-wise or column-wise order as created via a raster scan.

Figure 9:
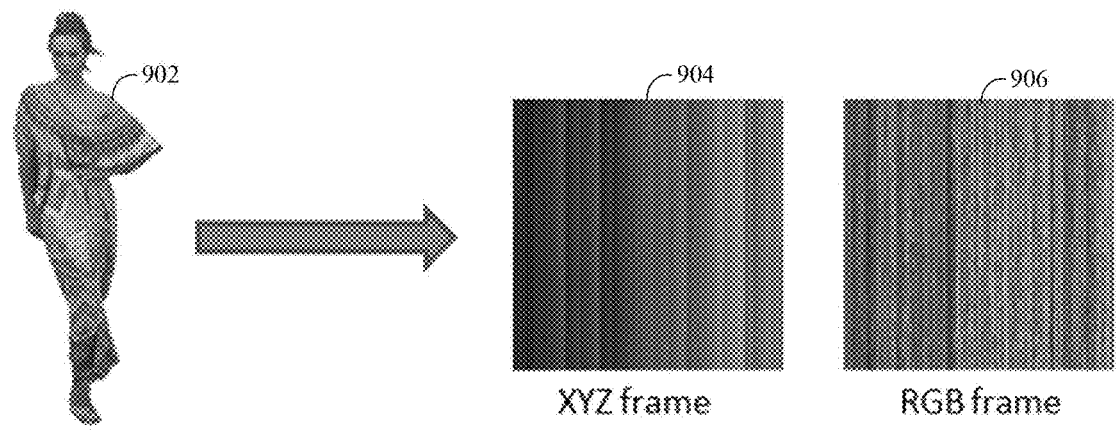
FIG. 9 illustrates an example raster scan mapping in accordance with an embodiment of this disclosure.

FIG. 9 illustrates an example raster scan mapping in accordance with an embodiment of this disclosure. The embodiment of the raster scan according to FIG. 9 is for illustration only and other embodiments could be used without departing from the scope of this disclosure. FIG. 9 illustrates a point cloud 902, a geometry (X, Y, Z) frame 904 and a color (RGB) frame 906.

The point cloud 902 can be similar to the point cloud 405 of FIG. 4, the mesh 410 of FIG. 4, the point clouds 502a and 502b of FIG. 5 the point cloud 602 of FIGS. 6A and 6B, the point cloud 710 of FIG. 7. The geometry frame 904 is the mapping of each X, Y, and Z coordinate of the point cloud 902 from the 3-D space to a 2-D plane using a raster scan. The color frame 906 is the mapping of each R, G, and B color coordinate of the point cloud 902 from the 3-D space to a 2-D plane using a raster scan. In the raster scan method, points are read from the point cloud 902 in the order they are stored in the point cloud 902. Then each attribute of the input point is mapped to the corresponding 2-D frame line by line.

The geometry frame 904 illustrates each of the X, Y, and Z geometry values of a point cloud stored in one color channel of the 2-D frame, sequentially, in a row-wise a raster scan order. Similarly, each of the R, G, and B color values of the point cloud are stored in one color channel of another video frame sequentially in the raster scan order. It is noted that the patches, (such as the patches 722 of FIG. 7B) are not recognizable in this sorting method.

Figure 10:
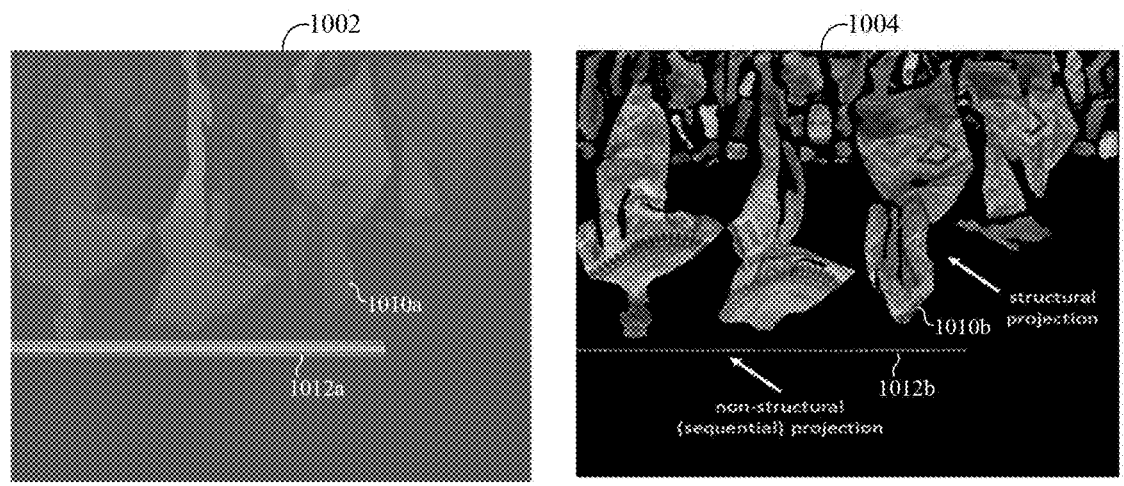
FIG. 10 illustrates an example projection with a structured portion and a non-structured portion in accordance with an embodiment of this disclosure.

FIG. 10 illustrates an example projection with a structured portion and a non-structured portion in accordance with an embodiment of this disclosure. The embodiment of the raster scan according to FIG. 10 is for illustration only and other embodiments could be used without departing from the scope of this disclosure. FIG. 10 illustrates geometry frame 1002 and a texture frame 1004. The geometry frame 1002 is similar to the frame 730, of FIG. 7C, depicts regular patches representing the depth values of the point cloud. For example, the patch 732 is similar to the patch 1010b. Similarly, the texture frame 1004 is similar to the frame 720, of FIG. 7B, depicts regular patches representing the texture of the point cloud. For example, the patch 722 is similar to the patch 1010a. The patches depicted in the geometry frame 1002 and the texture frame 1004, such as patches 1010a and 1010b and the other patches, are in a structural form. The non-structural projection 1012a and 1012b, of the geometry frame 1002 and the texture frame 1004, respectively, represent a portion of points that are stored in a rectangular region of each respective frame as created by a raster scan. The non-structural projection 1012a and 1012b lost their structural information. Re-ordering the points in a non-structural form can improve coding and decoding performances.

FIGS. 11A, 11B, 11C, 11D, and 11E illustrate an example sorting method for non-structural projections in accordance with an embodiment of this disclosure. The embodiment of the FIGS. 11A-11D are for illustration only and other embodiments could be used without departing from the scope of this disclosure. In certain embodiments, in order to sort the points, a sorting engine is included into the encoder, such as the encoder 600 of FIG. 6A.

Figure 11A:
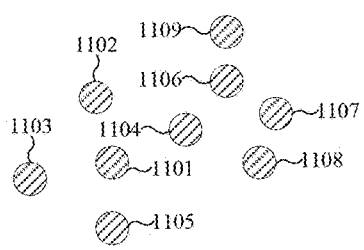

FIGS. 11A, 11B, 11C, 11D, and 11E depict a cluster of points, such as points 1101, 1102, 1103, 1104, 1106, 1107, 1108, and 1109. The following example illustrates sorting a portion of a 3-D point cloud based on a K-D tree for a non-structural projection. FIG. 11A illustrates a cluster of nine points of a point cloud, that of the point 1101, the point 1102, the point 1103, the point 1104, the point 1106, the point 1107, the point 1108, and the point 1109.

Figure 11B:
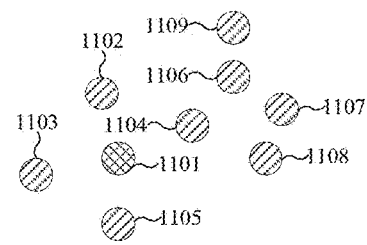
Figure 11C:
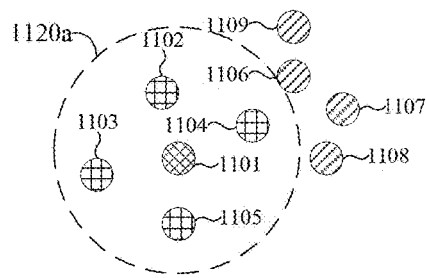

FIG. 11B, depicts a sorting engine randomly selecting point 1101 as the seed. FIG. 11C illustrates the sorting engine identifying each point within a predetermined distance 1120a between the seed point 1101 and the nearest points. The predetermined distance 1120a can be a proximity distance. For example, the predetermined distance 1120a identifies each point within its border. The predetermined distance 1120a includes the points 1102, 1103, 1104, and 1105. In certain embodiments, the sorting engine can find neighboring points to the seed point 1101 using a K-D tree. The neighboring points can then be mapped into the 2-D frame.

FIG. 11D illustrates the sorting engine ordering the points within the predetermined distance 1120a. The sorting engine can then list the points in an order of distance from the seed point 1101 into a list. For example, in order of distance from the seed point is the seed point 1101 itself, the point 1102, 1104, 1103, and the 1105. The points 1106, 1107, 1108, and 1109 are not listed, as these points are not within the predetermined distance 1120*a*. The order of the points is stored in a list that is referred to as an ordering list. In certain embodiments, the distance each point is from the seed is also recorded in the ordering list.

FIG. 11E illustrates the random selection of a new seed, such as point 1104. After the points that are within the predetermined distance 1120*a* to the seed point 1101 are recorded, then another point, other than the seed point 1101 is selected as the new seed. Points that are within the new predetermined distance 1120*b* are added to the ordering list. In order of distance, the points within the new predetermined distance 1120*b* are the point 1106, the point 1108, the point 1109, and the point 1107. The order list is updated to include the previous point order and the newly point order. For example, the ordering list then includes points in the following order, point 1101, point 1102, point 1104, point 1103, point 1105, point 1106, point 1108, point 1109, and point 1107. It is noted that points that are within the predetermined distance 1120*a* are not reordered if they also appear in the new predetermined distance 1120*b*. After the ordering list is updated based on points within the new predetermined distance 1120*b*, a new seed is selected and the process continues until all points in the subset of the input points are added.

In certain embodiments, the ordering engine can order the points recursively or non-recursively. The syntax below illustrates a non-recursive example or organizing and sorting points.

In the above example, syntax 8 illustrates a non-recursive code that sorts the points within in a subset of points, that of a 'pointSet'. The input include (i) 'pointSet' which is the input point cloud, (ii) 'maxNeighborCount' which is the maximum number of neighboring point for each point to search, (iii) 'neighborSearchRadius,' which is the radius of searching area around each point. The syntax 8 then outputs a list of ordered points, or indices.

In certain embodiments, projecting the 3-D point cloud onto a 2-D frame can be performed in a semi-structured method based on a minimum distance between points. For example, points can be grouped based on a similarity of one geometry component, such as the Y coordinate. For instance, the points are grouped based on similarity to the one geometry component. For instance, points with similar Y values are grouped together. Then points belonging to the group with similar Y values are placed in the Y-th line of the 2-D frame.

When points are grouped based on a similarity of one geometry component each point is sorted by first, selecting a point as an arbitrary seed, and then mapping the seed to a region on the 2-D frame. Thereafter the sorting engine identifies the closest points to the seed. After the closest points to the seed are identified, the sorting engine selects one of the neighbor points as the new seed. After the new seed is selected, the process repeats by mapping the seed to a region on the 2-D frame then identifies the closest points to the seed, a new seed is selected from the newly identified seeds and so on, until each point is sorted.

The following syntax illustrates sorting based on minimum distance metric with X-value grouping for projecting the 3-D point cloud onto a 2-D frame can be in a semi-structured.

Syntax 8:

```
Vector<size_t> sort3D(const vector<PCCPointSet> &pointSet, size_t maxNeighborCount,
    size_t neighborSearchRadius)
{
    size_t pointCount = pointSet.size( );
    vector<size_t> sortIdx;
    sortIdx.reserve(pointCount);
    PCCStaticKdTree3 kdtreePointSet;
    kdtreePointSet.build(pointSet);
    PCCPointDistInfo nNeighbor[maxNeighborCount];
    PCCNNResult result = { nNeighbor, 0 };
    PCCNNQuery3 query = { PCCVector3D(0.0), neighborSearchRadius, maxNeighborCount };
    std::vector<size_t> fifo;
    fifo.reserve(pointCount);
    std::vector<bool> flags(pointCount, true);
    for (size_t i = 0; i < pointCount; i++) {
        if (flags[i]) {
            flags[i] = false;
            sortIdx.push_back(i);
            fifo.push_back(i);
            while (!fifo.empty( )) {
                const size_t currentIdx = fifo.front( );
                fifo.erase(fifo.begin( ));
                query.point = pointSet[currentIdx];
                kdtreePointSet.findNearestNeighbors(query, result);
                for (size_t j = 0; j < result.resultCount; j++) {
                    size_t n = result.neighbors[j].index;
                    if (flags[n]) {
                        flags[n] = false;
                        sortIdx.push_back(n);
                        fifo.push_back(n);
                    }
                }
            }
        }
    }
}
```

Syntax 9:

```
size_t minDistIdx(const vector<uint16_t> &xx, const std::vector<uint16_t> &zz,
const std::vector<bool> &isSorted,
    size_t seedIdx)
{
    size_t minDist2 = (std::numeric_limits<size_t>::max)( );
    size_t newSeedIdx;
    for (size_t i = 0; i < xx.size( ); i++) {
        if (isSorted[i]) continue;
        size_t xDiff = (xx[seedIdx] > xx[i] ? xx[seedIdx] − xx[i] : xx[i] − xx[seedIdx]);
        size_t zDiff = (zz[seedIdx] > zz[i] ? zz[seedIdx] − zz[i] : zz[i] − zz[seedIdx]);
        size_t dist2 = xDiff * xDiff + zDiff * zDiff;
        if (minDist2 > dist2) {
            minDist2 = dist2;
            newSeedIdx = i;
        }
    }
    return newSeedIdx;
}
void sortMinDist(const std::vector<uint16_t> &xx, const std::vector<uint16_t>
&zz, std::vector<size_t> &indices)
{
    // sorts all points within the current group based on minimum-distance sorting
    // inputs/output:
    //   xx, yy, zz:   the geometry x, y, and z components of all points in the group
    //   indices   :   indices of sorted points
    indices.resize(xx.size( ));
    vector<bool> isSorted(xx.size( ), false);
    size_t seedIdx = distance(xx.begin( ), min_element(xx.begin( ), xx.end( )));
    for (size_t i = 0; i < xx.size( ); i++) {
        indices[i] = seedIdx;
        isSorted[seedIdx] = true;
        seedIdx = minDistIdx(xx, zz, isSorted, seedIdx);
    }
}
std::vector<size_t> sortRowMinDist(const std::vector<PCCPointSet> &pointSet)
{
    // group the input points, sort each group based on minimum-distance sorting,
and map the
    // sorted points within each group to one line of a video frame.
    // Inputs:
    //     pointSet:                         input point cloud
    size_t sizeU = 0, sizeV = 0;
    const size_t maxX = *max_element(pointSet.x.begin( ), pointSet.x.end( ));
    for (size_t v = 0; v <= maxX; v++) {
        size_t rowLen = 0;
        for (size_t i = 0; i < pointSet.size( ); i++) {
            if (pointSet.x[i] == v) {
                rowLen++;
            }
        }
        sizeV = max(sizeV, rowLen);
        sizeU += (rowLen > 0);
    }
    pointSet.sizeU = sizeU;
    pointSet.sizeV = sizeV;
    auto &frame = pointSet.frame0;
    frame.resize(sizeU * sizeV, (std::numeric_limits<int16_t>::max)( ));
    vector<uint16_t> yy, zz;
    yy.reserve(sizeV);
    zz.reserve(sizeV);
    for (size_t v = 0, k = 0; v <= maxX; v++) {
        for (size_t i = 0; i < pointSet.size( ); i++) {
            if (pointSet.x[i] == v) {
                yy.push_back(pointSet.y[i]);
                zz.push_back(pointSet.z[i]);
            }
        }
        if (yy.size( ) == 0) continue;
        vector<size_t> rowIndices;
        sortMinDist(yy, zz, rowIndices);
        size_t shift = floor((sizeV − rowIndices.size( )) / 2.0);
        for (size_t i = 0; i < yy.size( ); i++) {
            size_t p0 = (i + shift) * sizeU + k;
            frame.setPosition(p0, PCCVector3D(v, yy[rowIndices[i]], zz[rowIndices[i]]));
        }
```

Syntax 9:

```
    k++;
    yy.clear( );
    zz.clear( );
    }
}
```

In the above example, syntax 9 illustrates group sorting based on minimum-distance metric for points of a 3-D point cloud when the point cloud is projected onto a 2-D frame. The syntax 9 is based on finding the closest point to the seed. Syntax 9 uses the inputs xx, yy, and zz are geometry components such as x, y, and z of all points in the group. The reference 'isSorted' shows whether the point is already mapped. The reference 'seedIdx' is the index of current seed points. Syntax 9 outputs a list of ordered points. For example, syntax 9 depicts selecting an arbitrary point in a group of points. The arbitrary point is referred to as the first seed. The first seed is mapped to a video frame line. The syntax 9 identifies the point in the group that is closest to the arbitrarily selected point. That point (that is closest to the arbitrarily selected point) is mapped to the same frame line as the arbitrarily selected point. The newly added point is selected as the new seed. The process continues until all points in the group are mapped to the video frame line.

In certain embodiments, the projecting the 3-D point cloud onto a 2-D frame can be projected in a semi-structured method based on a K-D tree. For example, points can be grouped based on a similarity of one geometry component, such as the Y coordinate. Then each point is sorted by first, selecting an arbitrary point as a seed, and then mapping the seed to a region on the 2-D frame. Thereafter the sorting engine identifies points within a search range. Once points are identified within a search range, the points are mapped next to the seed in either ascending or descending distance order. Once the points are mapped, a new seed is selected. The new seed is one of the points that was previously mapped but not used as a seed. When a new seed is selected, the process repeats by mapping the seed to a region on the 2-D frame. Thereafter the sorting engine identifies points within a search range. Once points are identified within a search range, the points are mapped next to the seed in either ascending or descending distance order. Once the points are mapped, a new seed is selected. The new seed is one of the points that was previously mapped but not used as a seed. When a new seed is selected, the process continues until each group is sorted.

The following syntax illustrates K-D tree neighboring search based on an X-value grouping for projecting the 3-D point cloud onto a 2-D frame.

Syntax 10:

```
std::vector<size_t> sortRowDFS(const std::vector<PCCPointSet> &pointSet,
size_t maxNeighborCount,
          size_t neighborSearchRadius)
{
    auto &sortAxis = pointSet.x;
    size_t sizeU = 0, sizeV = 0;
    const size_t maxSortAxis = *max_element(sortAxis.begin( ), sortAxis.end( ));
    for (size_t v = 0; v <= maxSortAxis; v++) {
       size_t rowLen = 0;
       for (size_t i = 0; i < pointSet.size( ); i++) {
          if (sortAxis[i] == v) {
             rowLen++;
          }
       }
       sizeV = max(sizeV, rowLen);
       sizeU += (rowLen > 0);
    }
    pointSet.sizeU = sizeU;
    pointSet.sizeV = sizeV;
    auto &frame = pointSet.frame0;
    frame.resize(sizeU * sizeV, (std::numeric_limits<int16_t>::max)( ));
    vector<size_t> rowIndices;
    rowIndices.reserve(sizeV);
    PCCPointSet3 pointSetRow;
    pointSetRow.reserve(sizeV);
    vector<vector<size_t>> adj;
    std::vector<bool> flags;
    flags.reserve(sizeV);
    std::vector<size_t> fifo;
    fifo.reserve(sizeV);
    for (size_t v = 0, k = 0; v <= maxSortAxis; v++) {
       for (size_t i = 0; i < pointSet.size( ); i++) {
          if (sortAxis[i] == v) {
             pointSetRow.addPoint(PCCPoint3D(pointSet.x[i],       pointSet.y[i],
pointSet.z[i]));
          }
       }
```

Syntax 10:

```
size_t pointCountRow = pointSetRow.getPointCount( );
if (pointCountRow == 0) continue;
PCCStaticKdTree3 kdtreePointSetRow;
kdtreePointSetRow.build(pointSetRow);
PCCPatchSegmenter3::ComputeAdjacencyInfo1(pointSetRow,
kdtreePointSetRow,
     adj, neighborSearchRadius, maxNeighborCount);
flags.resize(pointCountRow, true);
for (size_t i = 0; i < pointCountRow; i++) {
  if (flags[i]) {
    flags[i] = false;
    fifo.push_back(i);
    int bestNeighbor = -1;
    while (!fifo.empty( )) {
      const size_t current = bestNeighbor >= 0 ? bestNeighbor : fifo.back( );
      rowIndices.push_back(current);
      fifo.erase(find(fifo.begin( ), fifo.end( ), current));
      size_t minNeighborCount = (std::numeric_limits<size_t>::max)( );
      bestNeighbor = -1;
      for (size_t j = 0; j < adj[current].size( ); j++) {
        size_t n = adj[current][j];
        if (flags[n]) {
          flags[n] = false;
          fifo.push_back(n);
          size_t neighborCount = 0;
          for (size_t k = 0; k < adj[n].size( ); k++) {
            if (flags[adj[n][k]]) {
              neighborCount++;
            }
          }
          if (neighborCount < minNeighborCount) {
            minNeighborCount = neighborCount;
            bestNeighbor = n;
          }
        }
      }
    }
  }
}
```

In the above example, syntax 10 illustrates using a K-D tree search to group and order points of a 3-D point cloud when the point cloud is projected onto a 2-D frame. For example, points with a similar X, Y, or Z geometry value can be grouped together and then a neighboring search data structure, such as a K-D tree can search for all neighboring points of each point within a predetermined distance or within a maximum number of neighboring points. First, an arbitrary point in a group is selected as a seed. The seed is mapped to a video frame line, similar to that of FIG. 11B. Next, a K-D-tree data structure is used to find points in the neighborhood of the seed that are mapped to the video frame that in proximity to the seed point. The neighboring points can be mapped in either an ascending distance order or a descending distance order. Once the points are mapped, one of the already mapped points that has not been a previously selected seed is selected as the new seed. The process continues until all points in the group are mapped to the video frame line.

In certain embodiments, the projecting the 3-D point cloud onto a 2-D frame can be projected in a semi-structured method based on a depth first search (DFS) or a breadth first search (BFS) to search for one or more neighing points. For example, points can be grouped based on a similarity of one geometry component, such as the Y coordinate. Then each point is sorted by first, selecting an arbitrary point as a seed, and mapping the seed to a region on the 2-D frame. Thereafter, the sorting engine identifies the best neighboring seed or seeds within a search range using DFS. The identified seed(s) are mapped next to the seed. The sorting engine then selects the best neighboring point as the new seed. When a new seed is selected, the process repeats by mapping the seed to a the best seed(s) to the 2-D frame, where the best seed(s) are identified based on DFS. Once the points are mapped, a new seed is selected. After a new seed is selected, the process until each point is mapped.

The following syntax illustrates DFS or BFS search based on an X-value grouping for projecting the 3-D point cloud onto a 2-D frame.

Syntax 11:

```
std::ector<size_t>  sortRowNN(const  vector<PCCPointSet>  &pointSet, size_t maxNeighborCount,
    size_t neighborSearchRadius)
{
size_t sizeU = 0, sizeV = 0;
const size_t maxSortAxis = *max_element(pointSet.x.begin( ), pointSet.x.end( ));
```

Syntax 11:

```
for (size_t v = 0; v <= maxSortAxis; v++) {
  size_t rowLen = 0;
  for (size_t i = 0; i < pointSet.size( ); i++) {
    if (sortAxis[i] == v) {
      rowLen++;
    }
  }
  sizeV = max(sizeV, rowLen);
  sizeU += (rowLen > 0);
}
pointSet.sizeU = sizeU;
pointSet.sizeV = sizeV;
auto &frame = pointSet.frame0;
frame.resize(sizeU * sizeV, (std::numeric_limits<int16_t>::max)( ));
vector<size_t> rowIndices;
rowIndices.reserve(sizeV);
PCCPointSet3 pointSetRow;
pointSetRow.reserve(sizeV);
for (size_t v = 0, k = 0; v <= maxSortAxis; v++) {
  for (size_t i = 0; i < missedPointsPatch.size( ); i++) {
    if (sortAxis[i] == v) {
        pointSetRow.addPoint(PCCPoint3D(missedPointsPatch.x[i],
missedPointsPatch.y[i], missedPointsPatch.z[i]));
    }
  }
  size_t pointSetRowCount = pointSetRow.getPointCount( );
  if (pointSetRowCount == 0) continue;
  PCCStaticKdTree3 kdtreePointSetRow;
  kdtreePointSetRow.build(pointSetRow);
  PCCPointDistInfo nNeighbor[maxNeighborCount];
  PCCNNResult result = { nNeighbor, 0 };
  PCCNNQuery3 query = { PCCVector3D(0.0), neighborSearchRadius,
maxNeighborCount };
  std::vector<size_t> fifo;
  fifo.reserve(missedPointCountRow);
  std::vector<bool> flags(missedPointCountRow, true);
  for (size_t i = 0; i < missedPointCountRow; i++) {
    if (flags[i]) {
      flags[i] = false;
      rowIndices.push_back(i);
      fifo.push_back(i);
      while (!fifo.empty( )) {
        const size_t current = fifo.back( );
        fifo.pop_back( );
        query.point = pointSetRow[current];
        kdtreePointSetRow.findNearestNeighbors(query, result);
        for (size_t j = 0; j < result.resultCount; j++) {
          size_t n = result.neighbors[j].index;
          if (flags[n]) {
            flags[n] = false;
            rowIndices.push_back(n);
            fifo.push_back(n);
          }
        }
      }
    }
  }
  size_t shift = floor((sizeV - rowIndices.size( )) / 2.0);
  for (size_t i = 0; i < missedPointCountRow; i++) {
    size_t p0 = (i + shift) * sizeU + k;
    frame.setPosition(p0, pointSetRow[rowIndices[i]]);
  }
  k++;
  rowIndices.clear( );
  pointSetRow.clear( );
  kdtreePointSetRow.clear( );
}
```

In the syntax above, syntax 11 illustrates using a DFS search to group and order points 3-D point cloud when the point cloud is projected onto a 2-D frame. The input points are grouped and each group can be sorted using a K-D tree search. The points are then mapped onto the 2-D frame. For example, points with similar X, Y, or Z geometry values are grouped and then a 2-D to one dimensional sorting algorithm is performed to search for neighboring points that are in proximity to one another based on a searching criteria. The algorithm can be DFS or BFS. First, the sorting engine selects an arbitrary point as a seed. The seed is mapped to a line in the video frame. Next the searching algorithm finds the best neighboring point or points. Those point(s) are mapped to the video frame next to the seed point. Thereafter, one of the already mapped points that has not been selected as a seed previously is selected as the new seed and the procedure continues until all points in the group are mapped to the video frame line.

Referring the above syntax 11, the input 'pointSet,' refers to the input point cloud. The input 'maxNeighborCount,' refers to the maximum number of neighboring points for each point to search. The input 'neighborSearchRadius,' refers to the radius of searching area around each point. The syntax 11 generates an output of an ordered list of points.

Figure 12:
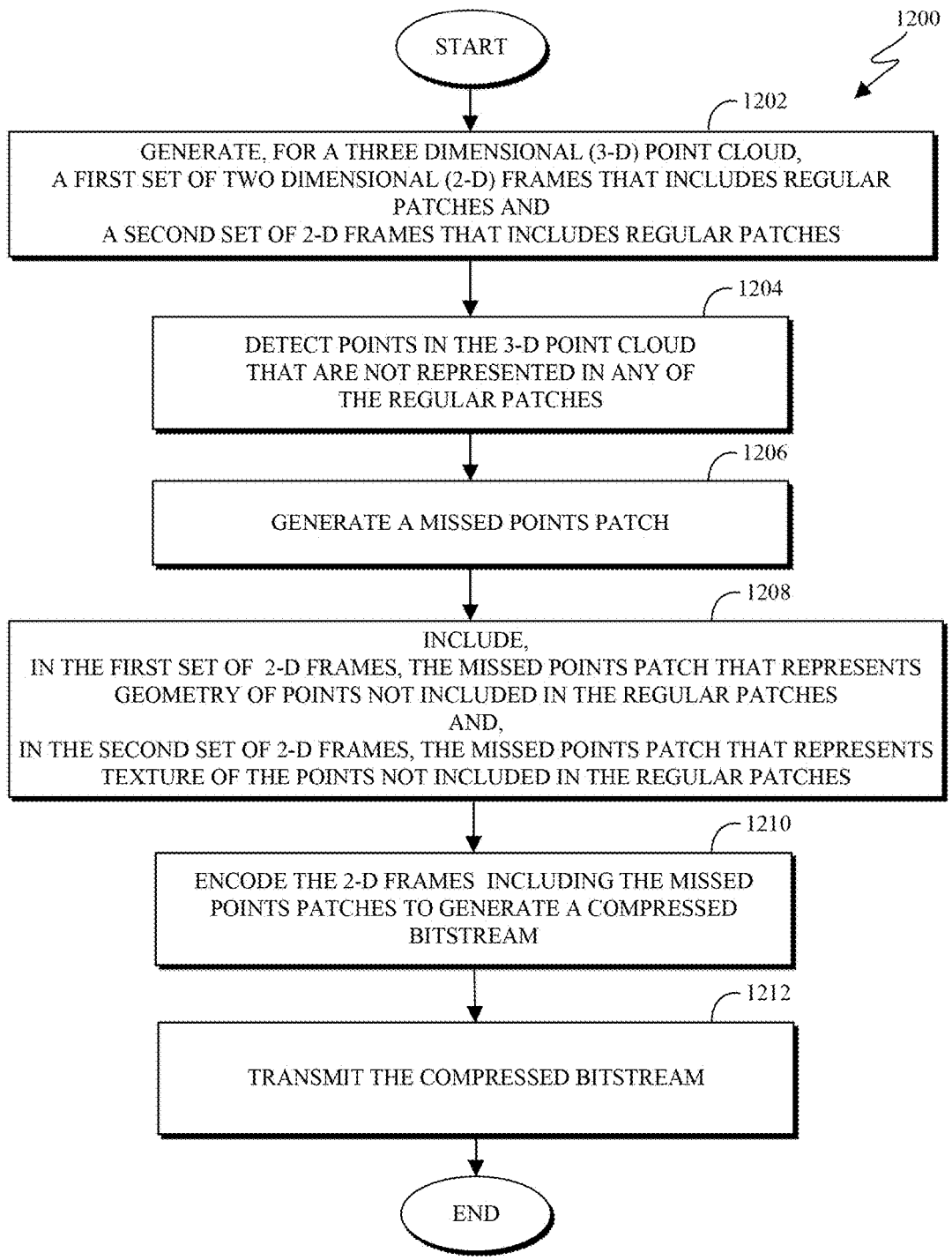
FIG. 12 illustrates an example flowchart for encoding a point cloud in accordance with an embodiment of this disclosure.

FIG. 12 illustrates an example flowchart for encoding a point cloud in accordance with an embodiment of this disclosure. FIG. 12 depicts flow chart 1200, for point cloud encoding. For example, the process depicted in FIG. 12 is described as implemented by the server 104 of FIG. 1, any one of client devices 106-114 of FIG. 1, the encoder 600 of FIG. 6A, and include internal components similar to those of the server 200 00 of FIG. 2, the electronic device 300 of FIG. 3.

The process beings with an encoder, such as the encoder 600 of FIG. 6A, generating a first set of 2-D frames and a second set of 2-D frame, for a 3-D point cloud (1202). It is noted that the first and second sets of 2-D frames can include one or more frames. In certain embodiments the first set of 2-D frames is two frames, and the second set of 2-D frames is two frames. The first set of 2-D frames include regular patches that represent geometry of the 3-D point cloud. The second set of 2-D frames include the regular patches representing texture of the 3-D point cloud. The regular patches each represent a cluster of 3-D points in the 3-D point cloud. In certain embodiments, the encoder 600 also generates an occupancy map of the 2-D frames. The occupancy map indicates locations of pixels in the 2-D frames that represent points in the 3-D point cloud The occupancy map can also indicate as location and a size of a missed points patch within the 2-D frames. In certain embodiments, auxiliary patch information is also generated. The auxiliary patch information can be a flag. The auxiliary patch information indicates at least one of a size of the missed points patch, a location of the missed points patch in at least one of 2-D frames, and a quantity of points included in the missed points patch, and the like. The encoder 600 can also generate a flag. The flag can be associated with each of the patches and indicates whether a patch (such as the regular patches or the missed points patch) is the missed points patch.

The process detects one or more overlapping points in the 3-D point cloud that are not represented in one of the regular patches (1204). Detecting overlapping points can include generating from one of the 2-D frames a second 3-D point cloud. The encoder 600 then compares the second 3-D point cloud to the first 3-D point cloud which is what the 2-D frames were generated from. In response to comparing the second 3-D point cloud to the first 3-D point cloud, the encoder can identify points of the first 3-D point cloud that are not included in the second 3-D point cloud.

After identifying points of the first 3-D point cloud that are not included in the second 3-D point cloud, the encoder 600 generates a missed points patch including the one or more overlapping points (1206). For example, the encoder 600 generates a missed points patch that represents geometry of one or more overlapping points as well as a missed points patch that represents texture of one or more overlapping points. To generate the missed points patch the encoder can group grouping the identified points of the 3-D point cloud that are not included in the second 3-D point cloud together. The grouped points are the missed points patch. In certain embodiments, the grouped points can be sorted to form a semi-structured patch.

The encoder 600 can determine quantity of the one or more overlapping points. Additionally, the encoder 600 can identify a format of the 2-D frames that are generated. If the formats of the 2-D frames are a 4:2:0 format, the first 2-D frame includes the geometric coordinates of each point of one or more overlapping points. If the format of the 2-D frames are a 4:4:4 format and the first 2-D frame includes three color channels, then the each of the three color channels include one the geometric coordinates of each point included in the missed points patch, respectively. Each of the three color channels corresponds to a coordinate direction. The encoder 600 can also identify a dimension of the 2-D frames. If the size of the 2-D frames exceeds a threshold that is based on the identified dimension of the 2-D frames, the dimension of the 2-D frames is increased.

In certain embodiments, to generate the missed points patch, the encoder 600 can sort the points to a particular order. Similarly, to generate the regular patches that are included in the 2-D frames, the encoder 600 can sort the points to a particular order. For example, the encoder 600 can generate list that indicates each point of the 3-D point cloud that is within a threshold proximity to one or more selected point of the 3-D point cloud. The location of each point can be mapped onto the 2-D frame based on the list. If the mapping of the points is based on a geometric coordinate position of each point, the same order can be applied to the color of each point. For example, to map a texture attribute of each point in the 3-D point cloud onto the second 2-D frame, the texture attribute of each point can be mapped based on the mapped location of each point on the first 2-D frame.

The process then includes in the first 2-D frame, a representation of geometry of the missed points patch and (1208). The process also includes in the second 2-D frame, a representation of texture of the missed points patch. The missed points patch includes geometry of points and texture of points of points that are not included in the regular patches. For example, the encoder 600 includes, in the first 2-D frame, the missed points patch that represents geometry of one or more overlapping points and, in the second 2-D frame, the missed points patch that represents texture of one or more overlapping points. The encoder 600 can position the representation of geometry of the missed points patch on the first 2-D frame as well as position the representation of texture of the missed points patch on the second 2-D frame. The position of the representation of geometry of the missed points patch on the first 2-D frame, corresponds to a similar position of the representation of texture of the missed points patch on the second 2-D frame.

The process then encodes the 2-D frames including the missed points patches to generate a compressed bitstream (1210). Thereafter, the encoder transmits the compressed bitstream (1212). The compressed bitstream can be ultimately transmitted to a decoder, such as the decoder 650.

Figure 13:
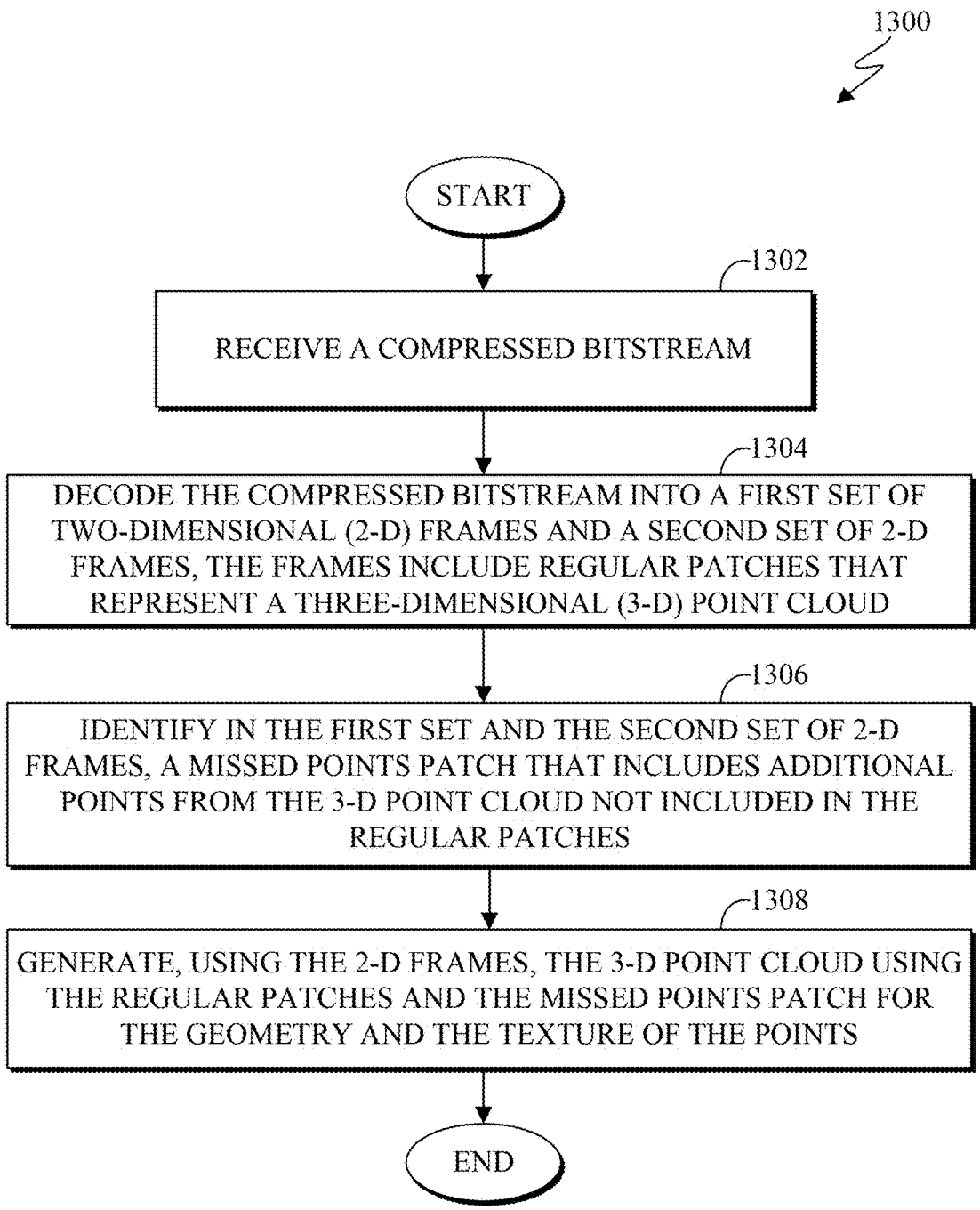
FIG. 13 illustrates an example flowchart for decoding a point cloud in accordance with an embodiment of this disclosure.

FIG. 13 illustrates an example flowchart for decoding a point cloud in accordance with an embodiment of this disclosure. FIG. 13 illustrates an example flowchart for decoding a point cloud in accordance with an embodiment of this disclosure. FIG. 13 depicts flow chart 1300, for point cloud decoding. For example, the process depicted in FIG. 12 is described as implemented by any one of client devices 106-114 of FIG. 1, the decoder 650 of FIG. 6B, and include internal components similar to those of the server 200 00 of FIG. 2, the electronic device 300 of FIG. 3.

The process begins with the decoder, such as decoder 650, receiving a compressed bitstream (1302). The received bitstream can include an encoded point cloud that was mapped onto multiple 2-D frames, compressed, and then transmitted and ultimately received by the decoder.

The process decodes the compressed bitstream (1304). The decoder 650 decodes the compressed bitstream into a first set of two-dimensional (2-D) frames and a second set of 2-D frames. It is noted that the first and second sets of 2-D frames can include one or more frames. In certain embodiments the first set of 2-D frames is two frames, and the second set of 2-D frames is two frames. The first set of 2-D frames include regular patches that represent geometry of a three-dimensional (3-D) point cloud. The second set of 2-D frames include regular patches representing texture of the 3-D point cloud. The regular patches each represent a cluster of 3-D points in the 3-D point cloud.

In certain embodiments, the decoder 650 also decodes auxiliary patch information from the compressed bitstream. The auxiliary patch information indicates a size of the missed points patch. The auxiliary patch information can also indicate a location of the missed points patch in at least one of 2-D frames. The auxiliary patch information can additionally indicate a quantity of points included in the missed points patch. The decoder 650 can also decode a flag. The flag can be associated with each of the patches and indicates whether a patch (such as the regular patches or the missed points patch) is the missed points patch.

The decoder 650 can also decode and identify an occupancy map that is included in the compressed bitstream. The occupancy map indicates locations of pixels in the set of 2-D frames that represent points in the 3-D point cloud. The occupancy map can also indicate a location and size of a missed points patch that is included in the set of 2-D frames.

The process then identifies a missed points patch in both the 2-D frames (1306). The missed points patch represents points of the 3-D point cloud that are not included in the regular patches. For example, the first set of 2-D frames can include a missed points patch that represents geometry of points of the 3-D point cloud. The second set of 2-D frames can include a missed points patch that represents texture of points of the 3-D point cloud. In certain embodiments, the missed point patches that represents geometry of points is the geometry of overlapping points of the 3-D point cloud. In certain embodiments, the missed point patches that represents texture of points is the texture of overlapping points of the 3-D point cloud. The missed points patch stores all three geometric coordinates whereas the regular patches store only the depth coordinate, as the placement for the regular patches on a frame indicate the other two coordinates, such as the X and Y coordinate.

The process then generates from the set of 2-D frames the 3-D point cloud using the missed points patch (1308). For example, the decoder 650 can generate, using the 2-D frames, the 3-D point cloud using the missed points patches for the geometry and the texture of the points of the 3-D point cloud. The decoder 650 analyzes the regular patches of the first set of 2-D frames to generate a shape of the 3-D point cloud. The decoder 650 also analyzes the regular patches of the second set of 2-D frames to apply a texture of the shape of the 3-D point cloud. The shape of the 3-D point cloud is augmented with information from the missed points patch included in the first set of 2-D frames. Similarly, the texture of the 3-D point cloud information from the missed points patch included in the second set of 2-D frames.

In certain embodiments, the decoder 650 can locate a representation of geometry of the missed points patch in the first set of 2-D frames, and a representation of texture of the missed points patch in the second set of 2-D frames. The location of the missed points patch in the first set of 2-D frames, can correspond to a similar position of the missed points patch in the second set of 2-D frames.

The decoder 650 can identify the format of the set of 2-D frames. The format of the 2-D frames, along with the information about the missed points patch bounding box, indicates to the decoder 650 location of the missed points patch. For example, if the format of the set of the 2-D frames are a 4:2:0 format, the decoder 650 can identify in the first set of 2-D frames geometric coordinates of each point included in the missed points patch. In another example, if the format of the set of the 2-D frames are a 4:4:4 format and the first 2-D frame includes three color channels, the decoder can identify in the each of the three color channels, of first set of 2-D frames, one the geometric coordinates of each point of one or more overlapping points, respectively. Each of the three color channels corresponds to a coordinate direction.

In certain embodiments, the decoder decodes the signal, and depending on a value that is associated with the signal the geometric coordinates of the points can be positioned on one or more frames. For example, if the signal is a first value, the geometry coordinates can be placed on the multiple color planes of the first set of 2-D frames. In another example, if the signal is a second value, the geometry coordinates can be placed on a single color plane of the first set of 2-D frames.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
  a communication interface configured to receive a compressed bitstream; and
  a processor operably coupled to the communication interface, wherein the processor is configured to:
    decode the compressed bitstream into a first set of two-dimensional (2-D) frames and a second set of 2-D frames, wherein the first set of 2-D frames include a first set of regular patches that represent geometry of a three-dimensional (3-D) point cloud and the second set of 2-D frames include a second set of regular patches representing texture of the 3-D point cloud, patches of the first and second set of regular patches representing respective clusters of 3-D points in the 3-D point cloud, identify, in the first set of 2-D frames, a missed points patch that represents geometry points of the 3-D point cloud not included in the first set of regular patches and, in the second set of 2-D frames, a missed points patch that represents texture of points of the 3-D point cloud not included in the second set of regular patches; and generate, using the sets of 2-D frames, the 3-D point cloud using the first and second sets of regular patches and the missed points patches.

2. The decoding device of claim 1, wherein the processor is further configured to:

identify flags that are associated with each patch included in the sets of 2-D frames, the flags indicate whether each patch is one of the missed points patches; and identify auxiliary patch information indicating a size of the missed points patches, a location of the missed points patches in the sets of 2-D frames, wherein the auxiliary patch information and the flags are decoded from the compressed bitstream.

3. The decoding device of claim 1, wherein the processor is further configured to:

locate the missed points patch that represents geometry in the first set of 2-D frames, and the missed points patch that represents texture in the second set of 2-D frames, wherein a location of the missed points patch that represents geometry in the first set of 2-D frames, corresponds to a position of the missed points patch that represents texture in the second set of 2-D frames.

4. The decoding device of claim 1, wherein the processor is further configured to:

identify a parameter included in the bitstream;

in response to identifying the parameter as a first value, identify geometric coordinates of each of the points in a single color plane of the first set of 2-D frames; and in response to identifying the parameter as a second value, placing geometric coordinates of each of the points in multiple color planes of the first set of 2-D frames, wherein each of the multiple color planes corresponds to a coordinate direction.

5. The decoding device of claim 1, wherein the processor is further configured to:

identify an occupancy map of the sets of 2-D frames, the occupancy map indicates locations of pixels in the sets of 2-D frames that represent points in the 3-D point cloud, and estimate a quantity of points included in each of the missed points patches based on the occupancy map.

6. The decoding device of claim 1, wherein generate from the sets of 2-D frames the 3-D point cloud, the processor is configured to:

analyze the regular patches of the first set of 2-D frames to generate a shape of the 3-D point cloud;

analyze the regular patches of the second set of 2-D frames to apply a texture of the shape of the 3-D point cloud;

augment the shape of the 3-D point cloud with information from the missed points patch included in the first set of 2-D frames; and augment the texture of the 3-D point cloud with information from the missed points patch included in the second set of 2-D frames.

7. An encoding device for point cloud encoding, the encoding device comprising:

a processor configured to:

generate, for a three-dimensional (3-D) point cloud, a first set of two-dimensional (2-D) frames that include a first set of regular patches that represent geometry of the 3-D point cloud and a second set of 2-D frames that includes a second set of regular patches representing texture of the 3-D point cloud, patches of the first and second set of regular patches representing respective clusters of 3-D points in the 3-D point cloud, detect points in the 3-D point cloud that are not represented in one of the sets of regular patches, generate a missed points patch that represents geometry of the detected points and a missed points patch that represents texture of the detected points, include, in the first set of 2-D frames, the missed points patch that represents geometry of the detected points and, in the second set of 2-D frames, the missed points patch that represents texture of the detected points, encode the sets of 2-D frames that include the missed point patches to generate a compressed bitstream, and a communication interface operably coupled to the processor, the communication interface configured to transmit the compressed bitstream.

8. The encoding device of claim 7, wherein the processor is further configured to:

generate flags that are associated with each patch included in the sets of 2-D frames, the flags indicates whether each patch is one of the patches of the first and second set of regular patches or one of the missed points patches; and generate auxiliary patch information indicating a size of the missed points patches, a location of the missed points patches in the sets of 2-D frames, wherein the auxiliary patch information and the flags are included in the compressed bitstream.

9. The encoding device of claim 7, wherein the processor is further configured to:

position the missed points patch representing geometry in the first set of 2-D frames, and the missed points patch representing texture in the second set of 2-D frames, wherein the position of the missed points patch representing geometry in the first set of 2-D frames, corresponds to a position of the missed points patch representing texture in the second set of 2-D frames.

10. The encoding device of claim 7, wherein to generate the missed points patches the processor is configured to:

determine a quantity of the detected points;

identify a format and dimension of the sets of 2-D frames;

in response to identifying the format of the sets of 2-D frames is a first format, include geometric coordinates of each point in a single color plane of the first set of 2-D frames;

in response to identifying the format of the sets of 2-D frames is a second format placing geometric coordinates of each of the points in multiple color planes of the first set of 2-D frames, wherein each of the multiple color planes corresponds to a coordinate direction; and increase the dimension of the sets of 2-D frames in response to the quantity of the detected points exceeding a threshold that is based on the identified dimension of the sets of 2-D frames.

11. The encoding device of claim 7, wherein the processor is further configured to generate an occupancy map of the sets of 2-D frames, wherein the occupancy map indicates locations of pixels in the sets of 2-D frames that represent points in the 3-D point cloud.

12. The encoding device of claim 7, wherein:
to detect the points in the 3-D point cloud that are not represented in one of the regular patches, the processor is configured to:
generate from one of the sets of 2-D frames a second 3-D point cloud,
compare the second 3-D point cloud to the 3-D point cloud, and
in response to comparing the second 3-D point cloud to the 3-D point cloud, identify points of the 3-D point cloud that are not included in the second 3-D point cloud; and
to generate the missed points patches, the processor is configured to group the identified points of the 3-D point cloud that are not included in the second 3-D point cloud together.

13. The encoding device of claim 7, wherein to generate the sets of 2-D frames, the processor is further configured to:
change a mapping location of points representing the geometry of the detected points in the sets of 2-D frames based on a proximity criteria;
change a mapping location of points representing the texture of the detected points in the sets of 2-D frames based on another proximity criteria; and
change a mapping location of points representing other attributes in the sets of 2-D frames based on a third proximity criteria.

14. A method for point cloud decoding, the method comprising:
receiving a compressed bitstream; and
decoding the compressed bitstream into a first set of two-dimensional (2-D) frames and a second set of 2-D frames, wherein the first set of 2-D frames include a first set of regular patches that represent geometry of a three-dimensional (3-D) point cloud and the second set of 2-D frames include a second set of regular patches representing texture of the 3-D point cloud, patches of the first and second sets of regular patches represent respective clusters of 3-D points in the 3-D point cloud,
identifying in the first set of 2-D frames, a missed points patch that represents geometry of points of the 3-D point cloud not included in the first set of regular patches, and in the second set of 2-D frames a missed points patch that represents texture of the points of the 3-D point cloud not included in the second set of regular patches; and
generating, using the sets of 2-D frames, the 3-D point cloud using the first and second sets of regular patches and the missed points patches.

15. The method of claim 14, further comprises:
identifying flags that are associated with each patch included in the sets of 2-D frames, the flags indicate whether each patch is one of the missed points patches; and
identifying auxiliary patch information indicating a size of the missed points patches, a location of the missed points patches in the sets of 2-D frames,
wherein the auxiliary patch information and the flags are decoded from the compressed bitstream.

16. The method of claim 14, further comprises:
locating the missed points patch that represents geometry in the first set of 2-D frames, and the missed points patch that represents texture in the second set of 2-D frames,
wherein a location of the missed points patch that represents geometry in the first set of 2-D frames, corresponds to a position of the missed points patch that represents texture in the second set of 2-D frames.

17. The method of claim 14, further comprises:
identifying a parameter included in the bitstream;
in response to identifying the parameter as a first value, identify geometric coordinates of each of the points in a single color plane of the first set of 2-D frames; and
in response to identifying the parameter as a second value, placing geometric coordinates of each of the points in multiple color planes of the first set of 2-D frames, wherein each of the multiple color planes corresponds to a coordinate direction.

18. The method of claim 14, further comprises:
identifying an occupancy map of the sets of 2-D frames, the occupancy map indicates locations of pixels in the sets of 2-D frames that represent points in the 3-D point cloud, and
estimate a quantity of points in each of the missed points patches based on the occupancy map.

19. The method of claim 14, wherein generating from the sets of 2-D frames the 3-D point cloud, further comprises:
analyzing the regular patches of the first set of 2-D frames to generate a shape of the 3-D point cloud;
analyzing the regular patches of the second set of 2-D frames to apply a texture of the shape of the 3-D point cloud;
augmenting the shape of the 3-D point cloud with information from the missed points patch included in the first set of 2-D frames; and
augmenting the texture of the 3-D point cloud with information from the missed points patch included in the second set of 2-D frames.

20. The method of claim 14, further comprises
identifying a parameter that is included in the compressed bitstream;
when the parameter is a first value, identify in a single color channel of the first set of 2-D frames, the points that represent the geometry coordinates of the 3-D point cloud; and
when the parameter is a second value, identify in three color channels of the first set of 2-D frames, the points that represent the geometry coordinates of the 3-D point cloud.

* * * * *